(12) United States Patent
Filipovich et al.

(10) Patent No.: US 7,170,057 B2
(45) Date of Patent: Jan. 30, 2007

(54) IMAGE ENHANCEMENT SYSTEM AND METHOD FOR NIGHT GOGGLES

(75) Inventors: Danny Filipovich, Lincolnwood, IL (US); Jack Fiore, Grayslake, IL (US); Robert O. Ziv, Newton, MA (US); Philip Uy, Antrim, NH (US)

(73) Assignee: Night Vision Corporation, Lincolnwood, IL (US)

( * ) Notice: Subject to any disclaimer, the term of this patent is extended or adjusted under 35 U.S.C. 154(b) by 42 days.

(21) Appl. No.: 10/250,388

(22) PCT Filed: Dec. 29, 2001

(86) PCT No.: PCT/US01/49988

§ 371 (c)(1),
(2), (4) Date: Dec. 12, 2003

(87) PCT Pub. No.: WO02/059654

PCT Pub. Date: Aug. 1, 2002

(65) Prior Publication Data

US 2004/0094700 A1    May 20, 2004

Related U.S. Application Data

(60) Provisional application No. 60/258,648, filed on Dec. 29, 2000.

(51) Int. Cl.
*H01S 1/00* (2006.01)
*G02B 26/00* (2006.01)

(52) U.S. Cl. .................. 250/330; 359/238; 250/251
(58) Field of Classification Search ............... 250/330, 250/332, 342; 359/364, 618, 630
See application file for complete search history.

(56) References Cited

U.S. PATENT DOCUMENTS

| | | | |
|---|---|---|---|
| 4,653,879 A | 3/1987 | Filipovich | |
| 4,655,562 A | 4/1987 | Kreitzer et al. | |
| 5,079,416 A | 1/1992 | Filipovich | |
| 5,404,225 A | 4/1995 | Bushman | |
| 5,416,315 A | 5/1995 | Filipovich | |
| 5,468,064 A * | 11/1995 | Lengyel et al. | 349/96 |
| 5,797,050 A * | 8/1998 | Smith | 396/241 |
| 5,886,822 A * | 3/1999 | Spitzer | 359/630 |
| 6,196,845 B1 | 3/2001 | Streid | |
| 6,639,706 B1 * | 10/2003 | Ziv et al. | 359/238 |

* cited by examiner

*Primary Examiner*—Otilia Gabor
(74) *Attorney, Agent, or Firm*—Daniel L. Boots; Bingham McHale LLP

(57) ABSTRACT

A dichroic type narrow-band-pass filter is used as a beam-splitter inside a night vision goggle eyepiece. The filter is combined with appropriately aligned polarizers and liquid crystal type shutter rotators movable between a "P" orientation and an "S" orientation to transmit center band and side band wavelengths of the normal view or night scene for recording, transmitting or enhancing. In the enhanced low light level mode, the intensified visible image presented to the user comprises a 40 degree circular image with a 30 degree by 22.5 degree rectangular display insert.

31 Claims, 23 Drawing Sheets

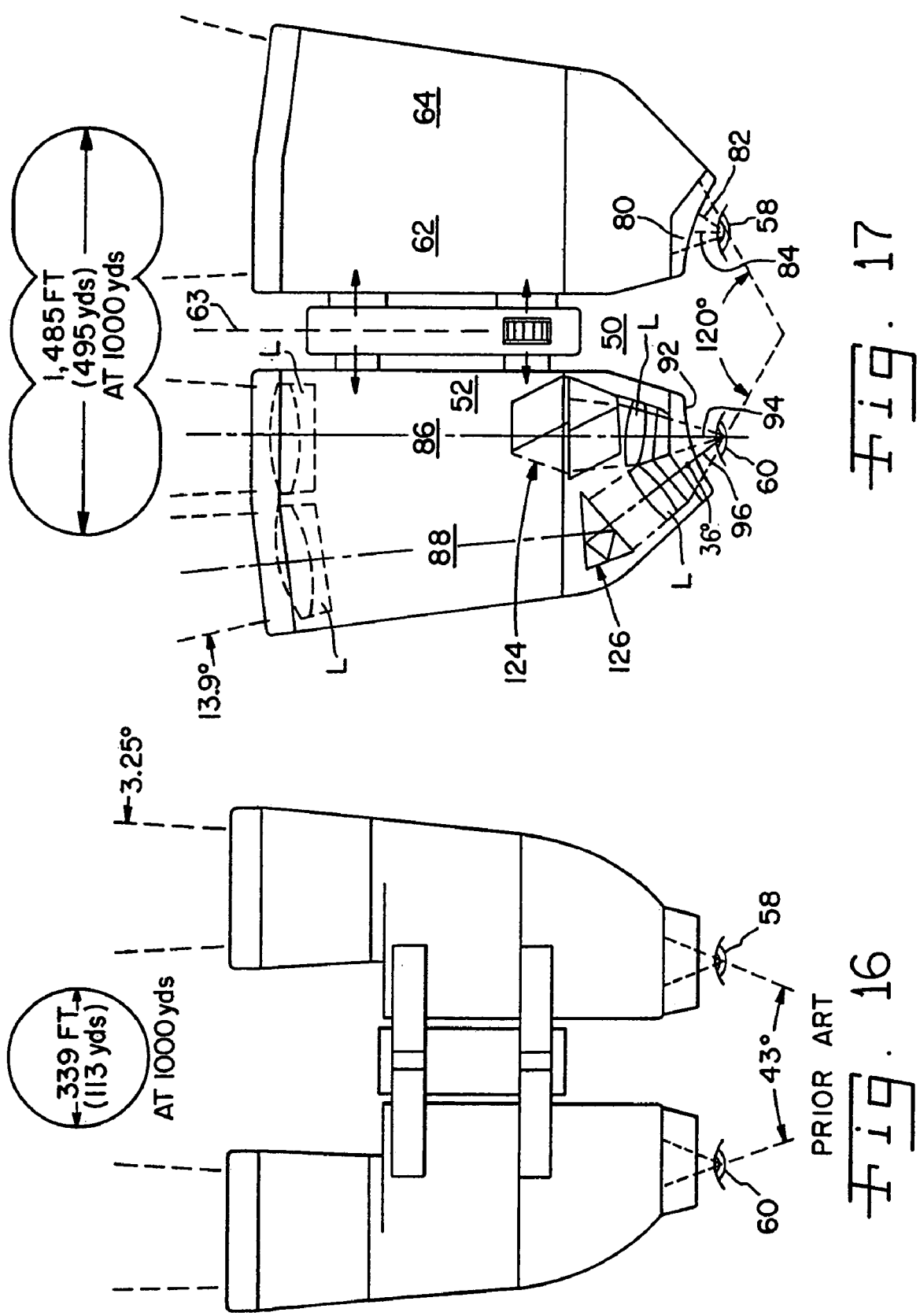

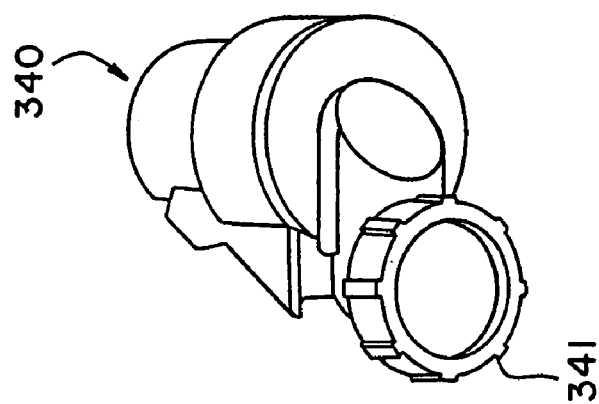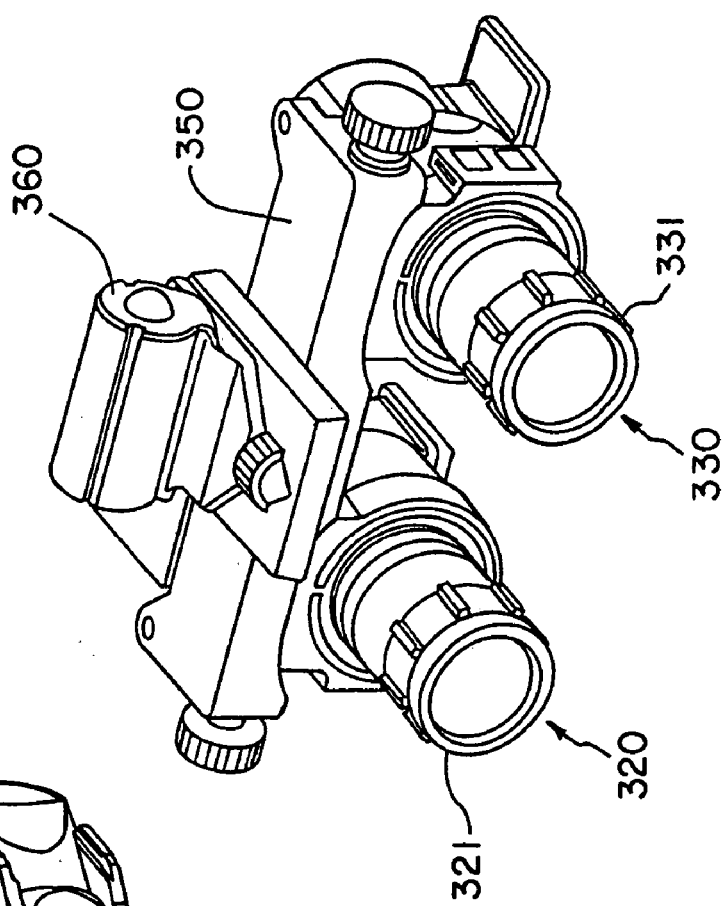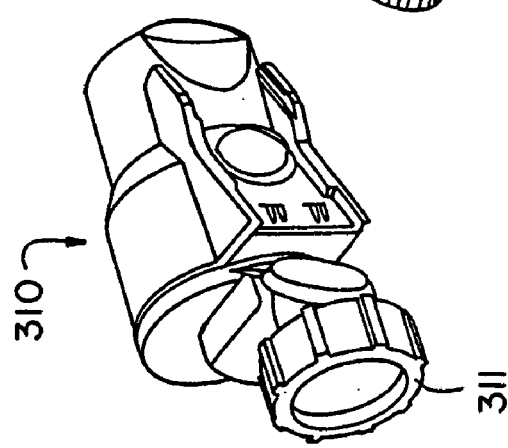
Fig. 32

DISPLAY IMAGE SUPERIMPOSED ON CENTRAL 40° IMAGE INTENSIFIED SCENE IN EITHER OR BOTH EYES. CAMERA VIEWS THE SAME AREA AS THE DISPLAY.

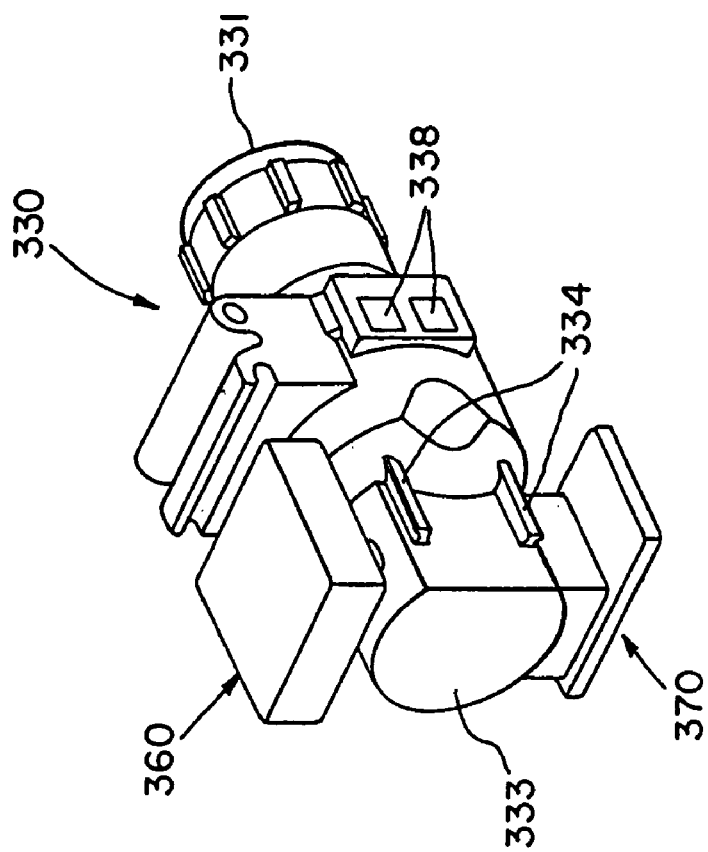
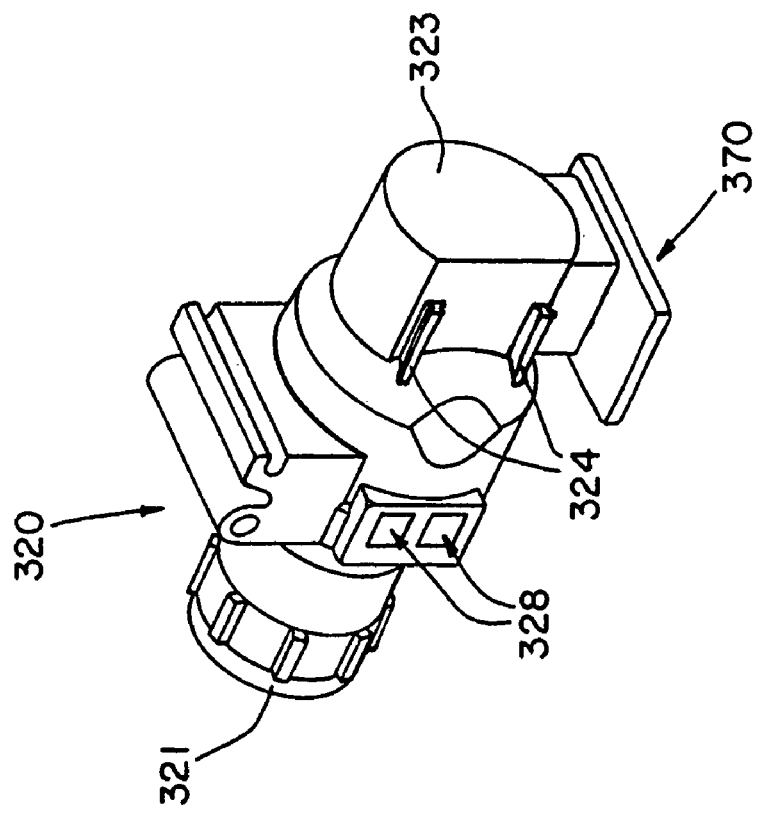
Fig. 39

IMAGE ENHANCEMENT SYSTEM AND METHOD FOR NIGHT GOGGLES

RELATED APPLICATION

This application claims priority on a U.S. provisional patent application, U.S. Ser. No. 60/258,648, titled MODULAR PANORAMIC NIGHT VISION GOGGLES, filed Dec. 29, 2000.

BACKGROUND OF THE INVENTION

1. Field of the Invention

This invention relates to an image enhancement system and method for night vision goggles that utilizes a spectral beamsplitter to enhance the low-light level sensitivity and resolution of the system, to enable the night missions to be recorded for later analyses, to transmit the video images of the night scene to a remote location in real time, and to insert or overlay the intensified image with images from other sensors and/or data.

2. Discussion of Related Art

Existing night vision systems have many applications in every day life. Perhaps the most well known use for night vision systems is by the military when performing nighttime maneuvers. The night vision systems permit vision under very low light conditions by converting incoming infrared and/or visible light from a viewed scene to an intensified visible light image. During nighttime maneuvers, military personnel are often performing other tasks, such as piloting an aircraft or driving a vehicle, which require the freedom of their hands while they are scanning the territory. Accordingly, night vision systems have been developed to be worn upon the head of a user, such as goggles being secured directly on the head or by being mounted to a helmet or a visor.

Placing a night vision system on the head of a user places significant constraints upon the optical design of the system. For example, goggles worn upon the head of a user must be both compact and light in weight because excessive weight or front-to-back length of the goggles can cause the goggles to exert large moments on the user's head causing severe instability problems and preventing their effective use in applications in which the user's head may be subjected to high gravitational or centrifugal loads. Furthermore, in a wide field of view optical system, the focal length of the eyepiece optics must be shortened correlatively that of the wide angle objective for unity magnification; and, in night vision goggles, this results in insufficient eye relief between the eyepiece optics and the eye, which not only causes discomfort to the user, but also interferes with the ability to position a helmet visor, eyeglasses and other structures between the goggles and the eyes of the user. In order to compensate for inadequate eye relief, prior night vision goggles have generally been limited to providing a field of view of no more than about 40 degrees.

Night visions goggles have been used in military aviation for several years with fields of views ranging from 30 degrees (Early Cat's Eyes night vision goggles from GEC-Marconi Avionics) to 45 degrees (NITE-OP and NITE-Bird night vision goggles, also from GEC-Marconi Avionics). The vast majority of night vision goggles used in military aviation have a 40-degree field of circular view (AN/AVS-6 and AN/AVS-9). A major limitation of such prior art devices is that increased field of view could only be obtained at the expense of resolution since each ocular uses only a single image intensifier tube and each image intensifier tube has a fixed number of pixels. Therefore, if the fixed numbers of pixels is spread over a larger field of view, then the angular subtense per pixel increases, which translates into reduced resolution. Understandably increased field of view is a major enhancement desired by military aviators, closely followed by resolution. In conventional goggles, both eyes also typically see the same field of view, i.e., there is a 100-percent overlap of the image viewed by both eyes of the observer. Such a limited field of view greatly restricts the effectiveness of the night vision apparatus.

U.S. Pat. No. 5,229,598 addresses the above-mentioned problems and discloses a compact, lightweight, night vision system capable of providing an enlarged field of view of up to 60 degrees with improved visual acuity and sufficient eye relief.

In addition to night vision systems, other imaging systems, such as hand-held binoculars, typically provide a rather limited field of view; and it would be desirable to provide such systems with increased fields of view as well. Individually sealed and self-contained constituent modular elements capable of providing some of the above-desired features, respectively, would enable such an imaging system to be built incrementally as desired.

SUMMARY OF THE INVENTION

The present invention regards a modular, binocular-like vision system for enabling an observer to view an object. The system includes an input end that receives light from the object and an optical transfer system that receives the light received from the input end and transfers the received light to an image intensifier which intensifies the received light, wherein the intensified received light is transferred to and transmitted out of an output end of the system, wherein the light transmitted out of the output end forms a field of view of the object that is greater than a 60-degree horizontal field of view.

Another aspect of the present invention regards a binocular-like vision system for enabling an observer to view an object. The system includes a first optical component having a first input end that receives light from the object and a first output end that receives light from the first input end, wherein the first output end defines a first optical axis along which light received from the first input end is transmitted. A second optical component having a second input end that receives light from the object and a second output end that receives light from the second input end, wherein the second output end defines a second optical axis along which light received from the second input end is transmitted. A third optical component comprising a third input end that receives light from the object and a third output end that receives light from the third input end, wherein the third output end defines a third optical axis along which light received from the third input end is transmitted, wherein light transmitted along the first, second and third optical axes forms a field of view comprising a first portion having a monocular effect on the observer and a second portion having a binocular effect on the observer.

Another aspect of the present invention regards a binocular-like vision system for enabling an observer to view an object. The system includes a first optical component having a first input end that receives light from the object and a first output end that receives light from the first input end, wherein the first output end defines a first optical axis along which light received from the first input end is transmitted. A second optical component having a second input end that receives light from the object and a second output end that receives light from the second input end, wherein the second output end defines a second optical axis along which light received from the second input end is transmitted. A third optical component having a third input end that receives light from the object and a third output end that receives light from the third input end, wherein the third output end defines a third optical axis along which light received from the third input end is transmitted, wherein light transmitted along the first, second and third optical axes is simultaneously transmitted from the binocular-like vision system to the observer.

In a further preferred embodiment of this invention, a panoramic night vision goggle (PNVG) is provided that, like the previous embodiment, features a partial overlap 100-degree horizontal by 40-degree vertical intensified field of view. Again, the central 30-degree horizontal by 40-degree vertical field of view is completely binocular, while the right 35 degrees is still seen with the right eye only and the left 35 degrees is viewed by the left eye only. Additionally, a thin line of demarcation separates the binocular scenes from the outside monocular scenes. This embodiment also utilizes the newly developed 16-mm image intensifier tube, dual fixed eyepieces, which are tilted and fused together, and four objective lenses, the inner two being adjustable and the outer two being fixed. The inner optical channels are not folded and are designed with fast F/1.05 objective lenses. The outboard channels use the folded inner channel optics design with F/1.17 objective lenses. The effective focal length of the eyepiece is 24.0 mm, while the physical eye clearance has been increased to 27 mm. All of the mechanical adjustments currently used on the AN/AVS-6 and AN/AVS-9 are the same (i.e., tilt, independent inter-pupilary distance adjustment, up/down, and fore/aft). This further embodiment may also be equipped with a heads-up display (HUD) if desired.

In yet another embodiment, the PNVG goggle is designed so that the individual optical channels are modular and thus detachable from each other. Each optical channel is a separately sealed and self-contained module. Removal of any single module from the PNVG assembly will not break any pressure seals or degrade the optical performance of the removed module or the remaining modules. Electrical power and information (i.e., data signals and the like) required by a module is provided through electrical connectors provided between the modules. The modules include means of attachment that ensures proper positioning and alignment of the adjacently mating modules. In a preferred embodiment, an integral electrical connector is contained within each module that enables the electrical connection between adjacent modules to be made simultaneously with the mechanical attachment of the module.

In addition to the modularity of the four primary optical channels of the PNVG assembly, the display (i.e., HUD) and camera are modular as well. Similar to the individual optical modules, each of these components are separately sealed and self-contained modules as well. Removal of the camera or display will not break any pressure seals or degrade the performance of the removed module or the remaining modules. Again, electrical power and information (i.e., data signals and he like) required by the camera or display is provided by electrical connectors means provided on each module.

Thus, in one preferred embodiment, this invention presents an apparatus that significantly increases the field of view of night vision goggles utilizing four modular optical components to produce a panoramic field of vision. This invention also presents the advantage of providing an enlarged field of view with improved visual acuity and sufficient eye relief for a compact, lightweight, modular, binocular-like vision system.

In a further preferred embodiment, a panoramic night vision goggle is provided having enhanced low-light level sensitivity and resolution, as well as the ability to record the night sessions for later analyses, to transmit the video data of the night scene to a remote location in real time, and to insert or overlay the intensified image of the night scene with images from other sensors and/or data.

To achieve these objectives, a dichroic type narrow-band-pass filter is used as a beamsplitter positioned inside the eyepiece of the night vision goggle. This filter is combined with appropriately aligned polarizers and rotators to direct the intensified images of the night scene for recording, transmitting or further video processing. A miniature video camera captures the intensified scene, which in normal light levels allows the video to be recorded or transmitted to remote locations. In low light, however, the weak video signal of the video camera is electronically enhanced and amplified such that a much clearer visual image of the night scene is displayed through the eyepiece.

In order to maximize the light signal level to the video camera, the narrow-band-pass filter is designed to reflect completely those side bands of the image intensifier that should not be transmitted by the eyepiece to the user's eye.

To provide for the insertion of different sensor images and to avoid superimposing the image from the display on the image from the image intensifier, a liquid crystal (LC) type shutter is positioned close to the image plane of the image intensifier. The shutter may be a single rectangular shape pixel or a multi-pixel type at selected areas specified by the user. This shutter is, at the same time, a rotator of polarization, used to switch the system to a different mode as needed, such as between a "direct view" mode at normal light levels and an enhanced low-light level (ELLL) mode during night or low-light level missions.

Further advantages and specific details of the invention will be set forth hereinafter in conjunction with the following detailed description of presently preferred embodiments.

BRIEF DESCRIPTION OF THE DRAWINGS

FIG. 16 shows a top view of a prior art binocular-like vision system and the field of view generated by the system;

FIG. 17 shows a top view of a fifth embodiment of a binocular-like vision system according to the present invention and the filed of view generated by the system;

FIG. 32 is a front perspective view of the modular embodiment of this invention showing the outer optical channels detached;

FIGS. 35 and 26 are top and rear plan views, respectively, of this modular invention showing the outer optical channels attached;

FIG. 39 shows in perspective the inner left and inner right optical modules.

DESCRIPTION OF THE PREFERRED EMBODIMENT

Figure 1:
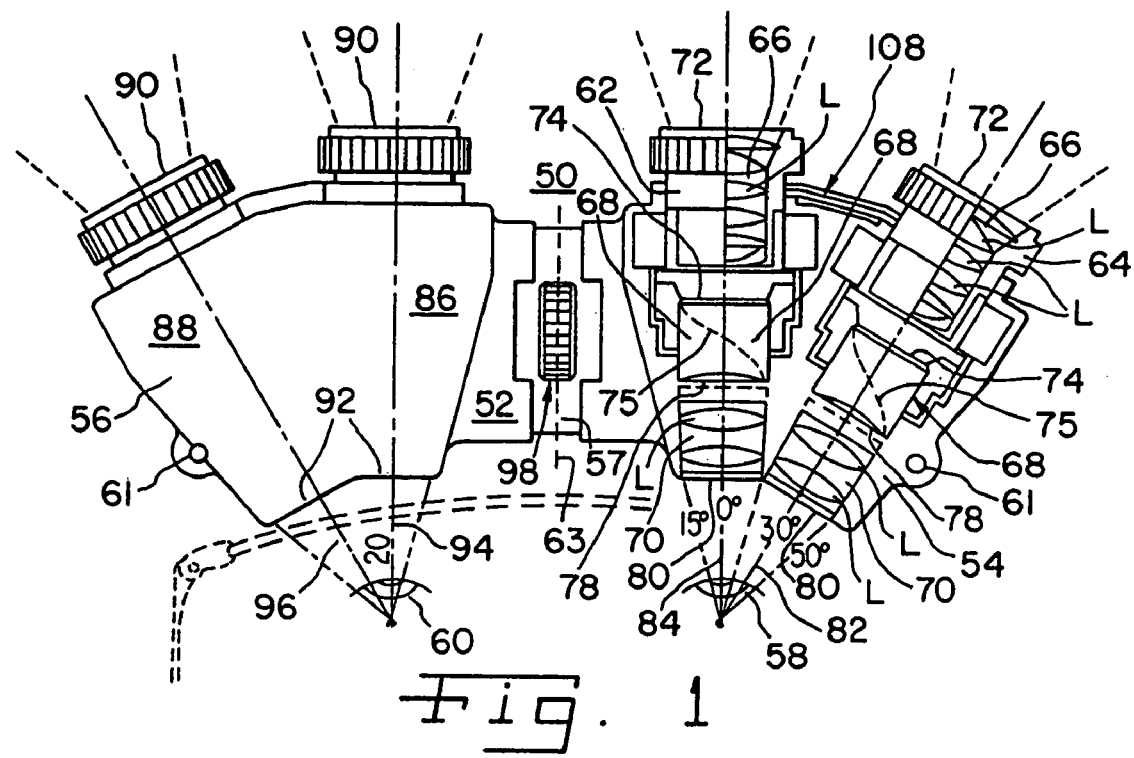
FIG. 1 is a top view of a binocular-like vision system according to the present invention.

Several binocular-type-viewing systems according to the present invention are schematically shown in FIGS. 1–23, wherein like elements are identified by like numerals. A wide-angle lens group that provide a desired field of view of, for example, 40 degrees and can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 21-mm, F/1.2. The lenses L of the objective optical system are preferably spherical or aspherical in design.

The objective optical system 66 is designed to receive light from an object being viewed at the input end 72 and to transfer an image of the object to the input end or photo-cathode side 74 of the image intensifier tube 68.

The image intensifier tube 68 makes it possible for the observer to view an object in dark conditions by receiving the visible and/or infrared light image of the object transferred to the input end 74 thereof. The image intensifier tube 68 converts the received image to an intensified visible output image in a predetermined narrow band of wavelengths at the output end 78 of the image intensifier tube 68. The image intensifier tube 68 is well known in the art. For example, the image intensifier tube 68 may include a GaAs photocathode at the input end 74 and the binocular-like vision systems 50 of FIGS. 1–23 generally have an input end (72, 90) that receives light from an object and an optical transfer system (62, 64, 86, 88) that receives the light received from the input end and transfers the received light to an output end (80, 92) of the system, wherein light transmitted out of the output end forms a field of view of the object that is greater than a 60 degree horizontal field of vision.

Figure 2:
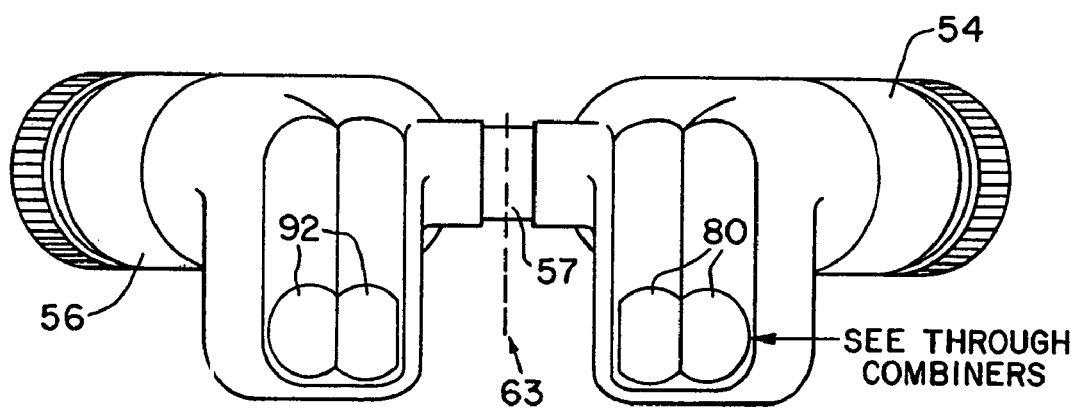
FIG. 2 is a rear view of the binocular-like vision system of FIG. 1.
Figure 3:
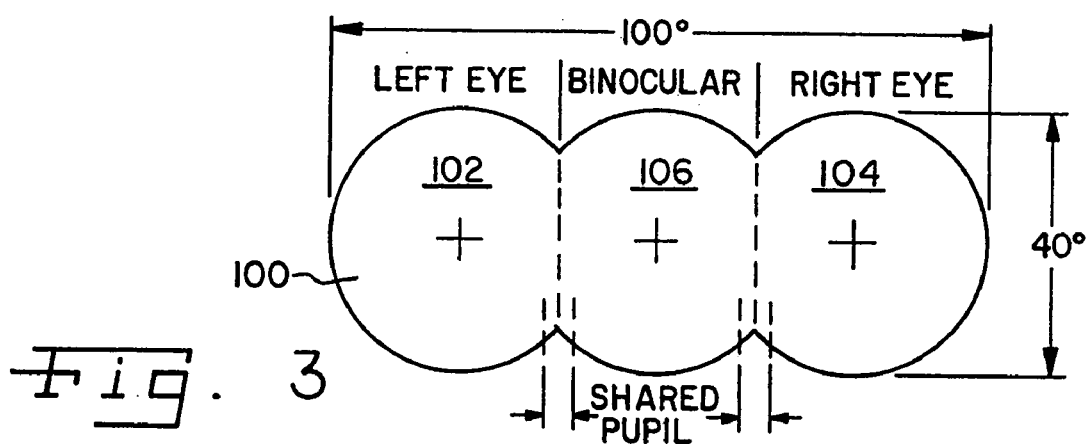
FIG. 3 schematically shows the field of view generated by the binocular-like vision system of FIG. 1.

FIGS. 1–3 show one embodiment of a binocular-like vision system 50 according to the present invention that operates in the above-described manner. The vision system 50 is contained in a housing assembly 52 which has a pair of housings 54 and 56 connected to one another by a bridge 57 and are arranged for respectively covering the right eye 58 and the left eye 60 of an observer. A pair of eyelets 61 are provided in the housings 54 and 56 to receive a strap or the like so that the user can conveniently carry the vision system 50 around his neck when not in use.

Each of housings 54 and 56 contain identical optical systems which are mirror images of each other about a plane 63 (denoted by dashed lines) that bisects the housing assembly 52 as shown in FIG. 1. Accordingly, the discussion to follow regarding the housing 54 is equally applicable to the housing 56.

As shown in FIG. 1, the housing 54 includes two separate optical components 62 and 64. The inner optical component 62 has the identical optical structure as the outer optical component 64. Accordingly, the discussion to follow regarding the structure of the inner optical component 62 is equally applicable to the outer optical component 64. The inner optical component 62 includes three main optical structures—(1) an objective optical system 66, (2) an image intensifier tube 68 and (3) an eyepiece optical system 70. The objective optical system 66 defines an input end 72 that receives light from an object. The objective optical system 66 includes output light from the image intensifier tube 68 is emitted by a green phosphor producing a visible band of light which is known as "P-20" light, although it will be appreciated that other image intensifier constructions could also be used.

The image intensifier tube 68 also includes a fiber optic bundle (schematically shown at 75) for transmitting bits of image data from the photocathode input end 74 to the phosphor output end 78 thereof. The fiber optic bundle 75 is preferably twisted in a manner well known in the art to provide an image rotation of 180 degrees so that an upright image of the object will be presented to the eye of the user.

The intensified visible output image generated by the image intensifier tube 68 is transferred to an output end 80 of the inner optical component 62 via the eyepiece optical system 70. The light transmitted through the output end 80 is transmitted along the optical axis 84 that is aligned with the optical axis of the right eye 58. The eyepiece optical system 70 can be of conventional design, such as disclosed in U.S. Pat. No. 5,416,315, the entire contents of which are incorporated herein by reference. The eyepiece optical system 70 includes approximately 2 to 7 optical elements, such as plastic or glass lenses L, which have an effective focal length of approximately, 21 mm, F/1.2. The lenses L of the objective optical system are preferably spherical or aspherical in design.

In order to enlarge the field of view, an outer optical component 64 is provided which also directs light from the object to the observer. As explained previously, the outer optical component 64 has the same optical structure as the inner optical structure 62 previously described. Like the inner optical component 62, the outer optical component 64 includes an objective optical system 66, an image intensifier tube 68 and an eyepiece optical system 70 which operate in the same manner as their counterparts in the inner optical component 62. Accordingly, the objective optical system 66 and the eyepiece optical system 70 of the outer optical component 64 each have an effective focal length of approximately 21-mm like their counterparts in the inner optical component 62.

The above-described outer optical component 64 operates in a manner similar to that of the inner optical component 62. The input end 72 of the outer optical component 64 receives light from an object. The received light is then transferred via the objective optical system 66 to the image intensifier which in turn generates an intensified image that is received by the eyepiece optical system 70. The eyepiece optical system 70 then sends the image to an output end 80 of the outer optical component 64. The light transmitted through the output end 80 travels along an optical axis 82 that is offset from the optical axis 84 by an angle ranging from approximately 30° to 35° and which is preferably 30 degrees.

As stated previously, the inner optical component 86 for the left eye 60 has the same structure and operates in the same manner as the inner optical component 62. Similarly, the outer optical component 88 for the left eye 60 has the same structure and operates in the same manner as the outer optical component 64. In other words, the inner and outer optical components 86 and 88 each receive light from an object at the input ends 90 and transfer their images of the object to respective output ends 92. As shown in FIG. 1, the image from the inner optical component 86 intensifier tube 68 which is projected along an optical axis 94 that is aligned with the optical axis of the left eye 60 and, thus, substantially parallel to the optical axis 84. The image from the outer optical component 88 is projected along an optical axis 96 that is offset from the optical axis 94 by an angle ranging from 30 degrees to 35 degrees, preferably approximately 30 degrees. As best shown in FIG. 2, the two eyepiece optical systems 70 for each of the housings 54 and 56 are positioned adjacent to each other so that both images at the output ends 80 and 92 appear continuous without a noticeable line of demarcation between the exit elements of the eyepiece optical systems. With respect to the forward looking direction, the two adjacent eyepiece optical systems for each housing 54 and 56 provide a continuous horizontal field of view that begins about 50 degrees to the right (or to the left) and ends 15 degrees to the left (or to the right).

As shown in FIG. 1, the optical systems are in line with the line of sight of the observer's eyes 58 and 60. In addition, as shown in FIG. 2, the output ends 80 and 92 may each be offset below their respective input ends 72 and 90. This is accomplished by inserting well known mirror systems or prism systems (not shown) between the output ends 78 of the image intensifier tubes 68 and the eyepiece optical components 70. The apparatus also includes a well-known mechanism 98 for adjusting the interpupillary distance between the eyepiece optical systems in the two housings 54 and 56 to accommodate different users.

The field of view 100 generated by the light simultaneously transmitted along the four optical axes 82, 84, 94, 96 to the observer is schematically shown in FIG. 3. The field of view 100 is the result of having the sub-fields of view formed from each of the output ends 80 and 92 overlap one another. Each of the four sub-fields of view are circular having a horizontal field of view of approximately 40 degrees and a vertical field of view of approximately 40 degrees. The field of view 100 includes two peripheral portions 102 and 104 that are separated from one another and each portion 102 and 104 has a monocular effect on the observer. The field of view 100 includes an overlapping central portion 106 spanning approximately 30 degrees. The central portion 106 is positioned between the monocular portions 102 and 104 and is viewed by both eyes 58 and 60 of the observer so as to provide full depth perception and exact stereo vision in the central portion. The field of view 100 has a vertical field of view of approximately 40 degrees and a horizontal field of view of approximately 100 degrees.

The above described binocular-like vision system 50 of FIGS. 1–3 has a mass of approximately 550 g, a microchannel plate (MCP) pitch of ranging from 6 to 7 microns, a limiting resolution of greater than or equal to 60 LP/mm, eye relief of greater than or equal to 20 mm and system resolution of approximately 1.15 cy/mr min. Note that in order to produce a distortion-free system 50, the magnifications of all four optical components 62, 64, 86 and 88 must be controlled to be within 2.5% of each other. In addition, a coupled focus mechanism 108 is provided to adjust the position of the input ends in the X and Y directions so that any mismatch between two adjacent images at the output ends is eliminated.

Other variations of the binocular-like vision system 50 are possible by varying the objective and eyepiece optical systems 66 and 70 in numerous ways in a manner well known in the art. For example, a horizontal field of view of—approximately 120 degrees and a vertical field of view of approximately 50 degrees is formed by the binocular-like vision system 50 of FIGS. 4–6. The binocular-like vision system 50 of FIGS. 4–6 basically has the same structure as and functions like the system 50 previously described with respect to FIGS. 1–3 with some minor changes to the objective optical components 66 and the eyepiece optical components 70 of the optical components 62, 64, 86 and 88. The image intensifier tubes 68 are unchanged.

As with the vision system 50 of FIGS. 1–3, the inner optical components 62, 86 and the outer optical components 64 and 88 each have identical optical structures. The objective optical system 66 and eyepiece optical system 70 can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 17-mm. The eyepiece optical system 70 includes approximately 2 to 7 optical elements, such as plastic or glass lenses L, which have an effective focal length of approximately 22 mm. The lenses L of both the objective optical systems 66 and the eyepiece optical systems 70 are preferably spherical or aspherical in design.

Figure 4:
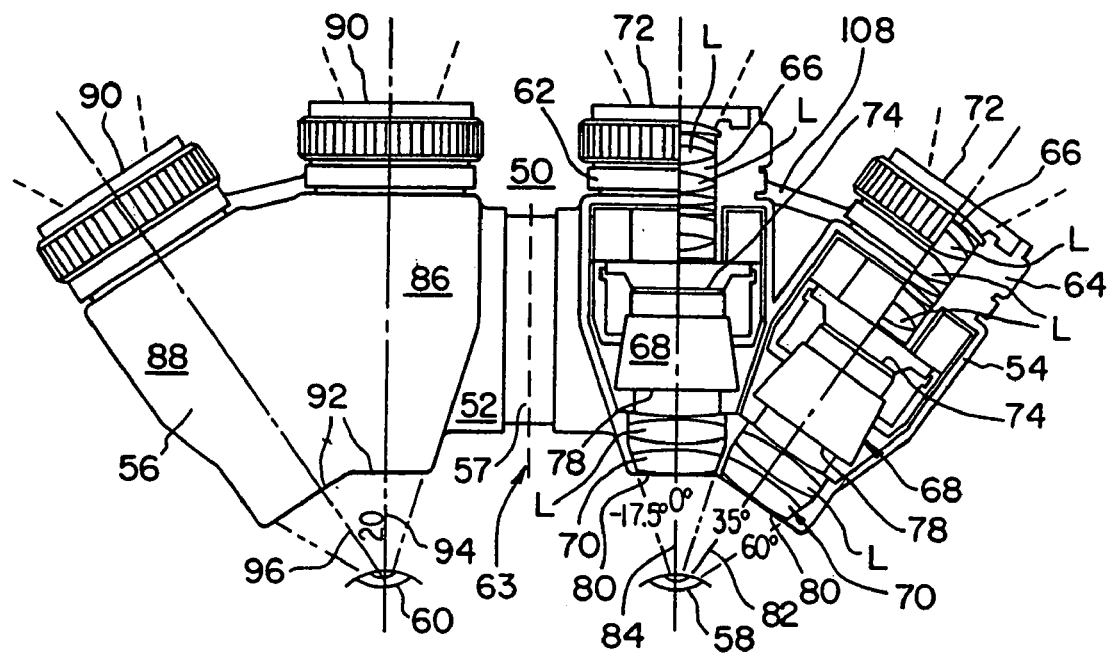
FIG. 4 is a top view of a second embodiment of a binocular-like vision system according to the present invention.

As shown in FIG. 4, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

Figure 6:
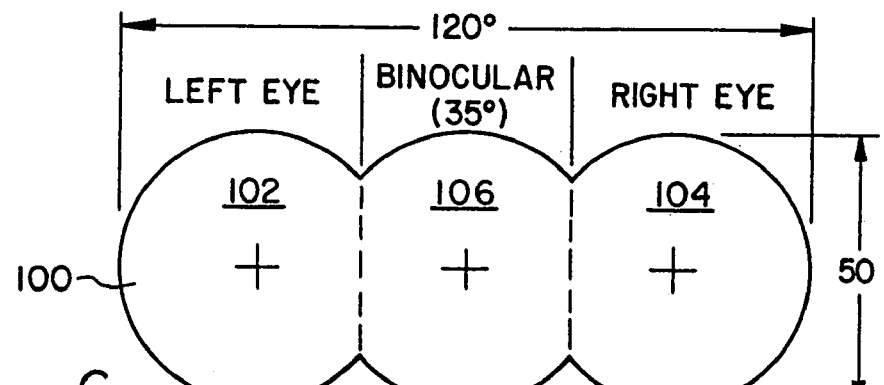
FIG. 6 schematically shows the field of view generated by the binocular-like vision system of FIG. 4.

The field of view 100 generated by the light simultaneously transmitted along the four optical axes 82, 84, 94 and 96 is schematically shown in FIG. 6. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. In a manner similar to that shown in FIG. 3, the field of view 100 includes two monocular portions 102, 104 and a 35-degree binocular portion 106. The field of view 100 has a vertical field of view of approximately 50 degrees and a horizontal field of view of approximately 120 degrees.

Figure 5:
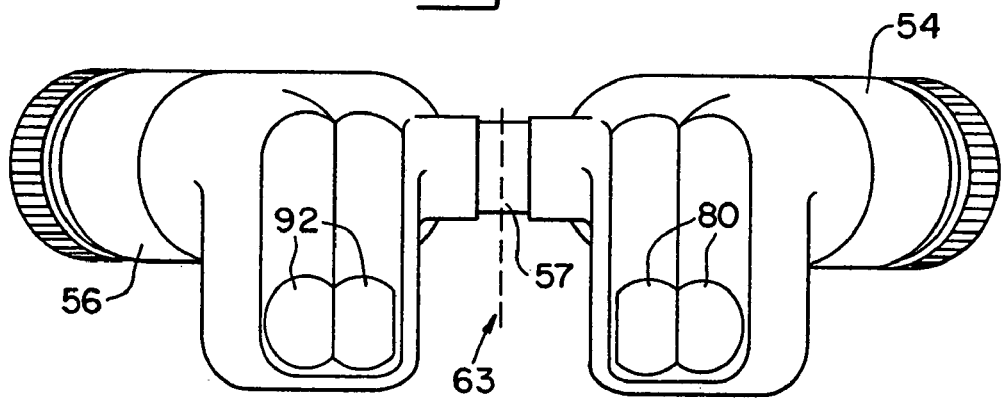
FIG. 5 is a rear view of the binocular-like vision system of FIG. 4.

The above described binocular-like vision system 50 of FIGS. 4–6 has a mass of approximately 550 g, a limiting resolution ranging from 57 to 60 LP/mm and a system resolution of approximately 0.93 cy/mr mm.

Figure 7:
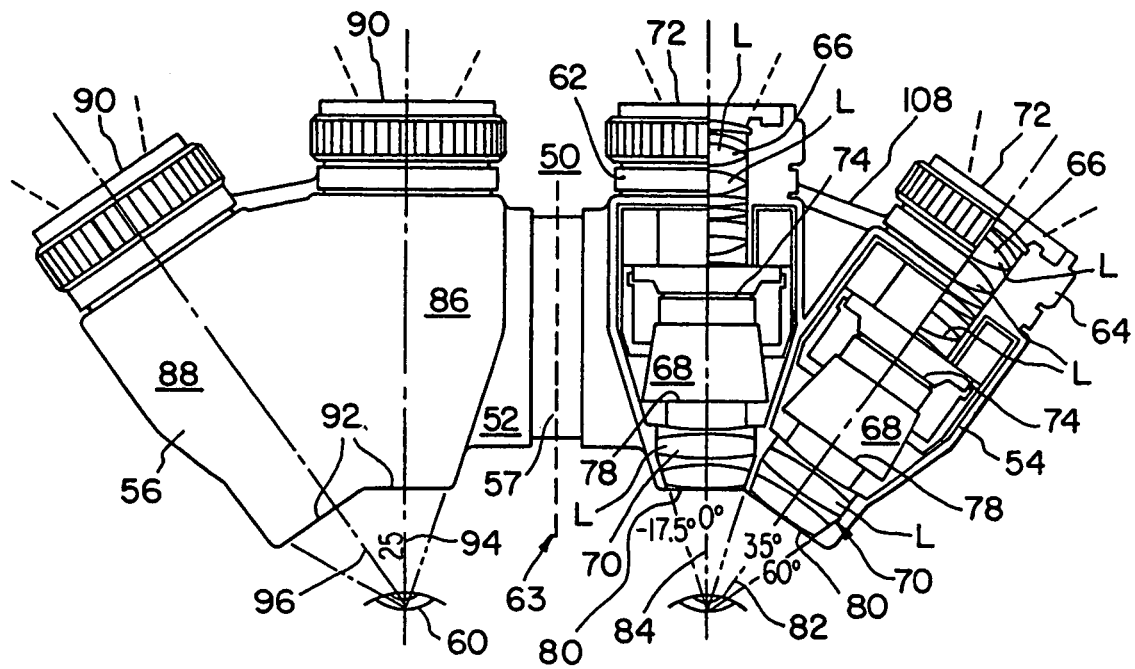
FIG. 7 is a top view of a third embodiment of a binocular-like vision system according to the present invention.
Figure 8:
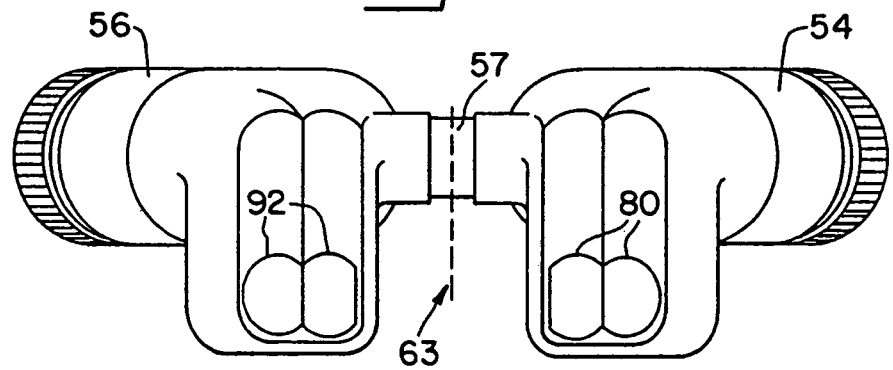
FIG. 8 is a rear view of the binocular-like vision system of FIG. 7.
Figure 9:
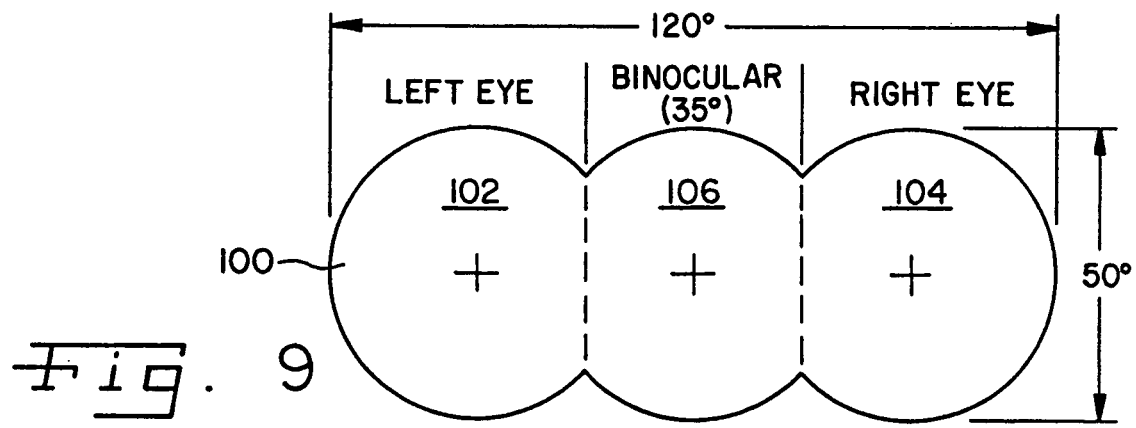
FIG. 9 schematically shows the field of view generated by the binocular-like vision system of FIG. 7.
Figure 10:
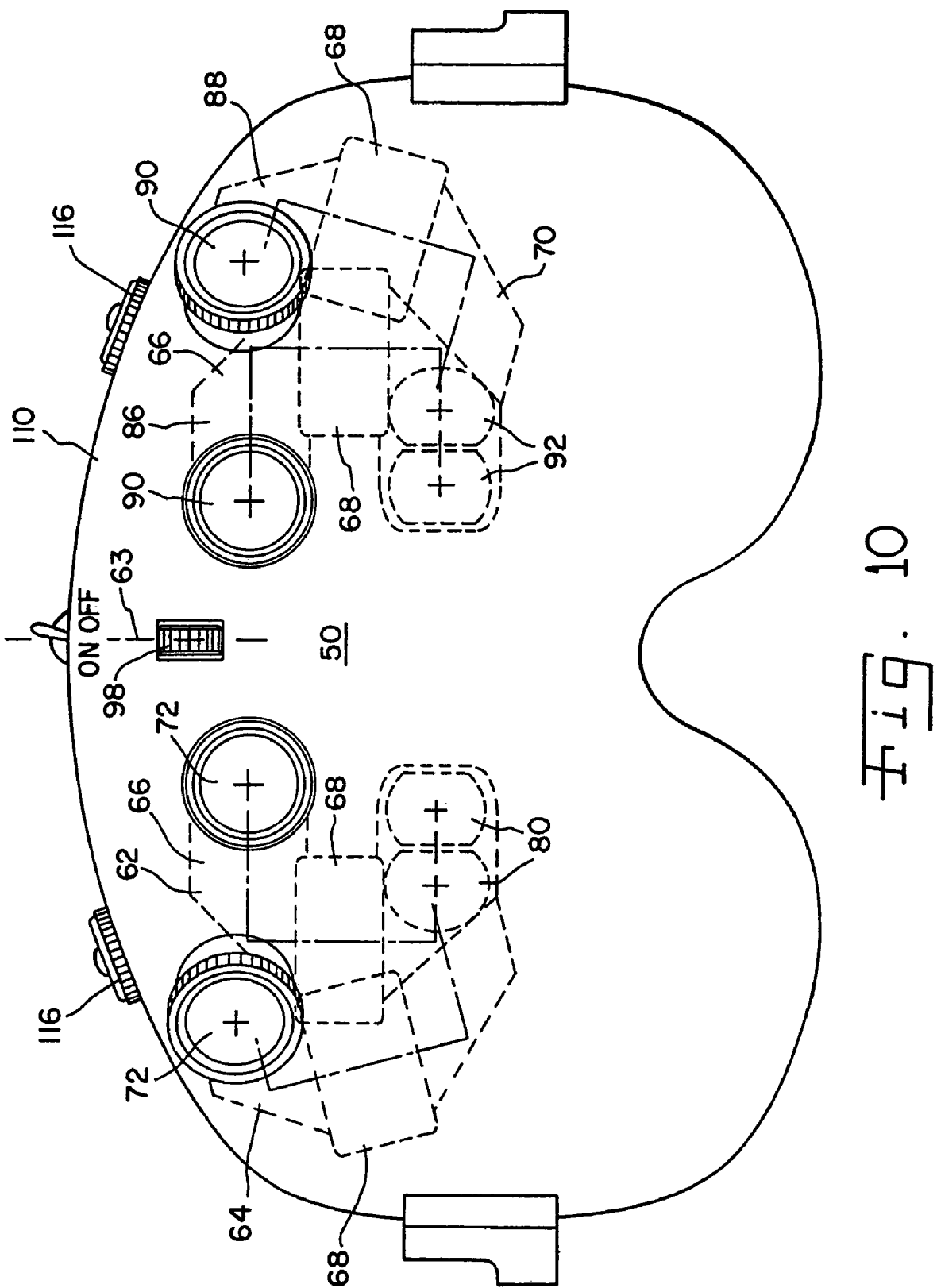
FIG. 10 is a front view of a fourth embodiment of a binocular-like vision system according to the present invention.

The binocular-like vision system 50 of FIGS. 7–9 basically has the same structure as and functions like the vision system 50 previously described with respect to FIGS. 4-6 where the objective optical components 66 of the inner and outer optical components 62, 64, 86 and 88 are each replaced with an identical 26 to 27 mm effective focal length objective optical component 66 sold by Night Vision Corporation under the NOVA-8 trademark. The image intensifier tubes 68 are also sold by Night Vision Corporation under the NOVA-8 trademark.

As with the vision system 50 of FIGS. 1–6, the inner optical components 62, 86 and the outer optical components 64 and 88 each have identical optical structures for the objective optical systems 66, the image intensifier tubes 68 and the eyepiece optical systems 70. The eyepiece optical system 70 can be of conventional design, such as disclosed in U.S. Pat. No. 5,416,315, the entire contents of which are incorporated herein by reference. The eyepiece optical system 70 includes approximately 2 to 7 optical elements, such as plastic or glass lenses L, which have an effective focal length of approximately 26 to 27 mm. The lenses L of both the objective optical system 66 and the eyepiece optical system 70 are preferably spherical or aspherical in design.

As shown in FIG. 7, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light simultaneously transmitted along the four optical axes 82, 84, 94 and 96 is schematically shown in FIG. 9. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. In a manner similar to that shown in FIG. 3, the field of view 100 includes two monocular portions 102, 104 and a 35-degree binocular portion 106. The field of view 100 has a vertical field of view of approximately 50 degrees and a horizontal field of view of approximately 120 degrees.

The above described binocular-like vision system 50 of FIGS. 7–9 has a mass of approximately 950 g, a limiting resolution of greater than 60 LP/mm, a MCP pitch of 6–7 microns and a system resolution ranging from 1.1 to 1.4 cy/mr min.

Figure 12:
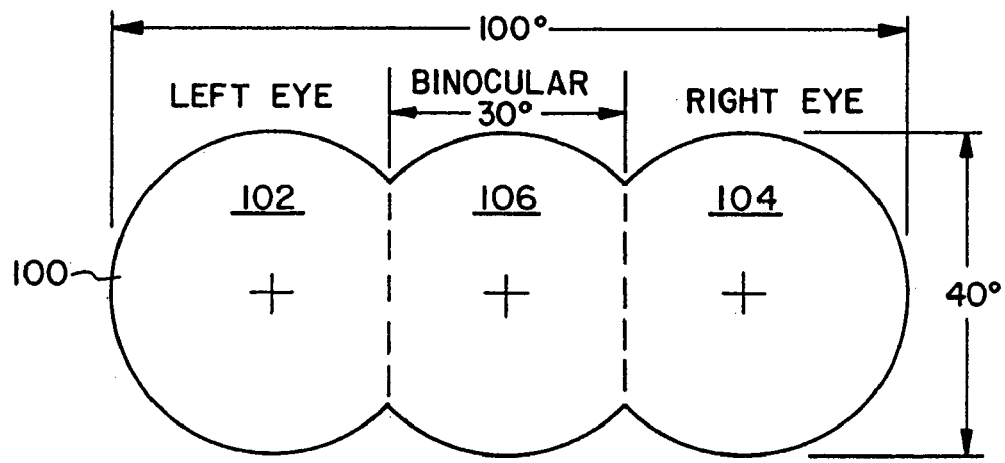
FIG. 12 schematically shows the field of view generated by the binocular-like vision system of FIG. 10.
Figure 13:
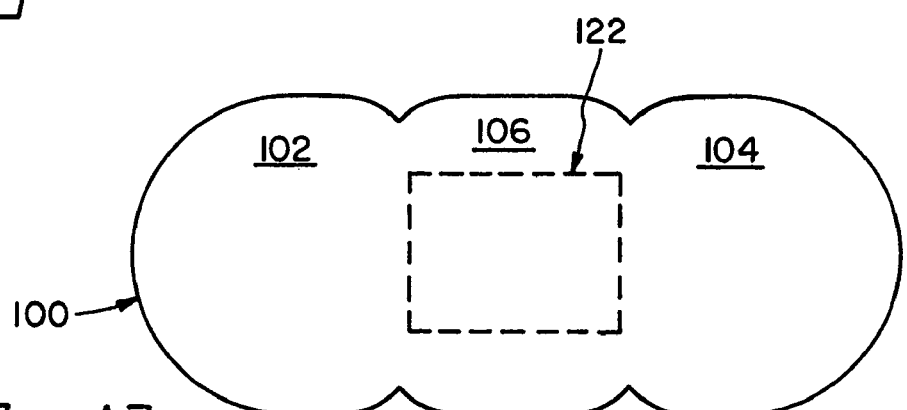
FIG. 13 schematically illustrates a head up display (HUD) superimposed on the field of view of FIG. 12.
Figure 14:
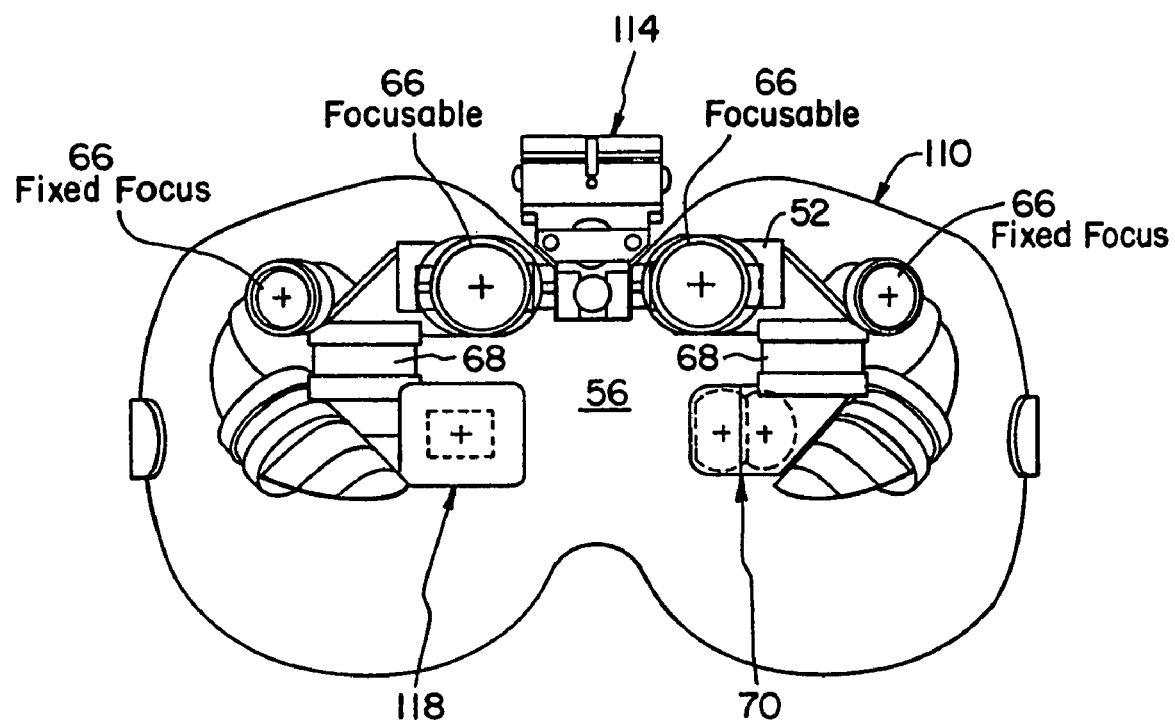
FIG. 14 is a front view of the binocular-like vision system of FIG. 10 with a mounting structure for attachment to a helmet.
Figure 15:
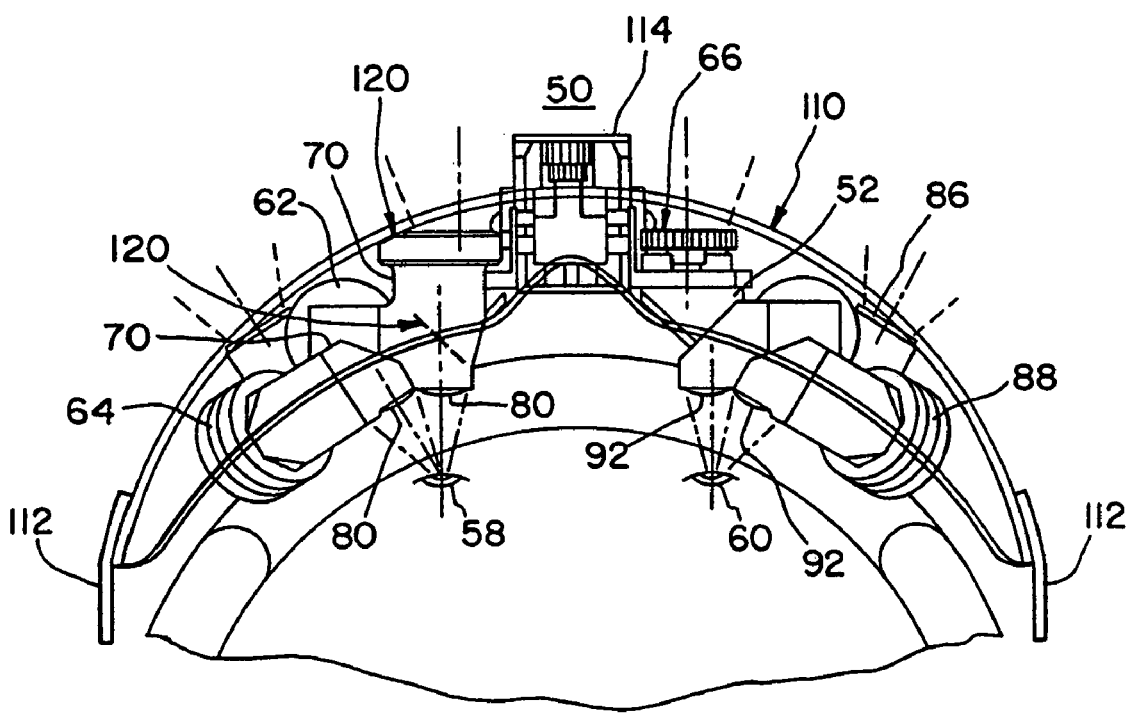
FIG. 15 is a bottom view of the binocular-like vision system of FIG. 14.
Figure 18:
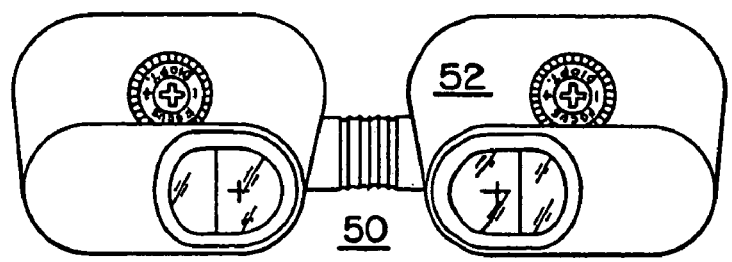
FIG. 18 is a front view of a sixth embodiment of a binocular-like vision system according to the present invention.
Figure 19:
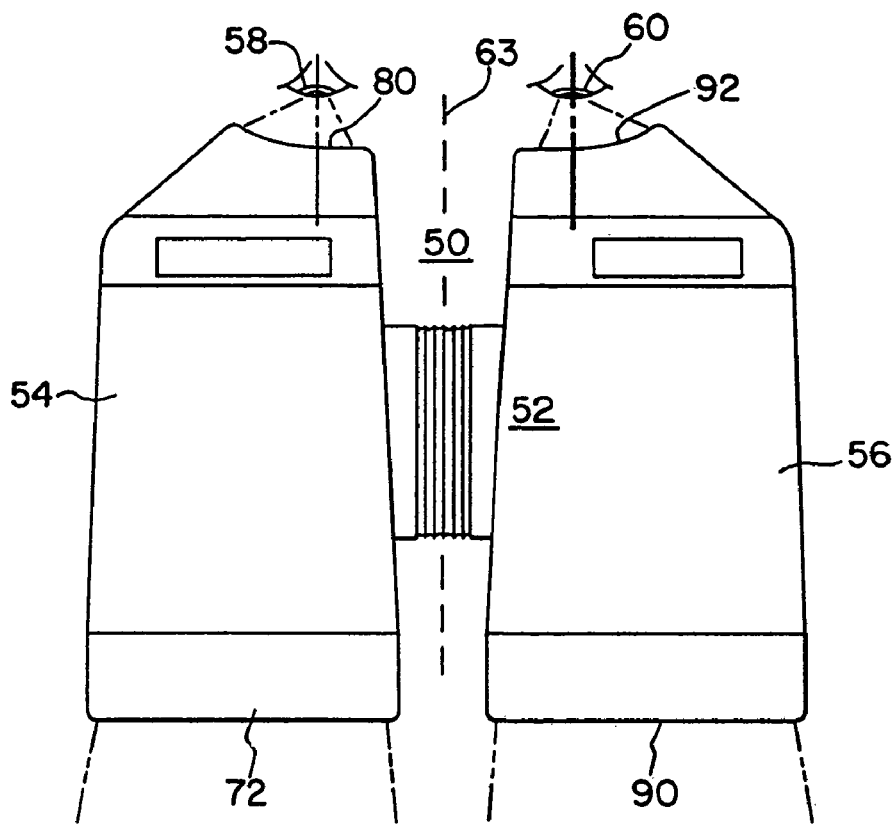
FIG. 19 is a top view of the binocular-like vision system of FIG. 18.
Figure 20:
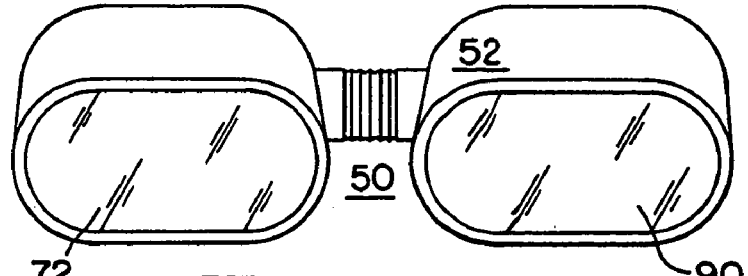
FIG. 20 is a rear view of the binocular-like vision system of FIG. 18.

A fourth embodiment of a binocular-like vision system according to the present invention is shown in FIGS. 10–15. More particularly, FIGS. 10–15 illustrate a vision visor system in which a binocular-like vision system 50 is mounted to a helmet-mounted visor 110 for use by aircraft pilots and the like. As shown in FIGS. 14–15, the visor 110 is mounted to the helmet 112 by an Aviator Night Vision Imaging System (ANVIS)-type mount 114. The mount 114 allows the visor 110 to move between a down position in front of the eyes of the observer during use and an up position away from the observer's face when not in use. The vision system 50 typically includes input ports to project Head-up display (HUD) information and for other purposes, suitable power source couplings and other structures that do not form a part of the present invention and are thus not described herein.

The binocular-like vision system 50 of FIGS. 10–15 generally has the same structure as and functions like the vision system 50 previously described with respect to the systems 50 of FIGS. 1–9 where the objective and eyepiece optical components 66 and 70 of the inner and outer optical components 62, 64, 86 and 88 are each replaced with optical components to give a desired field of view. As with the vision system 50 of FIGS. 1–9, the inner optical components 62, 86 and the outer optical components 64 and 88 each have identical optical structures for the objective optical systems 66, the image intensifier tubes 68 and the eyepiece optical systems 70. The objective and eyepiece optical systems 66 and 70 can be of conventional design, such as disclosed in U.S. Pat. No. 5,416,315, the entire contents of which are incorporated herein by reference. The objective optical system 66 includes approximately optical elements, such as plastic or glass lenses L, which have an effective focal length of approximately 21.9-mm. The eyepiece optical system 70 includes approximately optical elements, such as plastic or glass lenses L, which have an effective focal length of approximately 21.9-mm. The lenses L of both the objective optical system 66 and the eyepiece optical system 70 are preferably spherical or aspherical in design.

As shown in FIGS. 10–11 and 14 15, all four light components 62, 64, 86 and 88 have light paths which are folded in contrast to the linear like light paths of the binocular-like vision systems 50 of FIGS. 1–9. The folded light paths are formed by a number of well known fold prisms along the optical paths and between the image intensifier tubes 68 and the eyepiece optical systems 70 in a manner as described in U.S. Pat. No. 5,416,315, the entire contents of which are incorporated herein by reference. The folded optical paths allow the apparatus to be packaged radially close to the face along the contour of the visor 110, thereby minimizing any resulting shift in the center of gravity of total head-borne weight. The apparatus also provides a low profile that minimizes any adverse aerodynamic effects that might develop under windblast conditioning.

Figure 11:
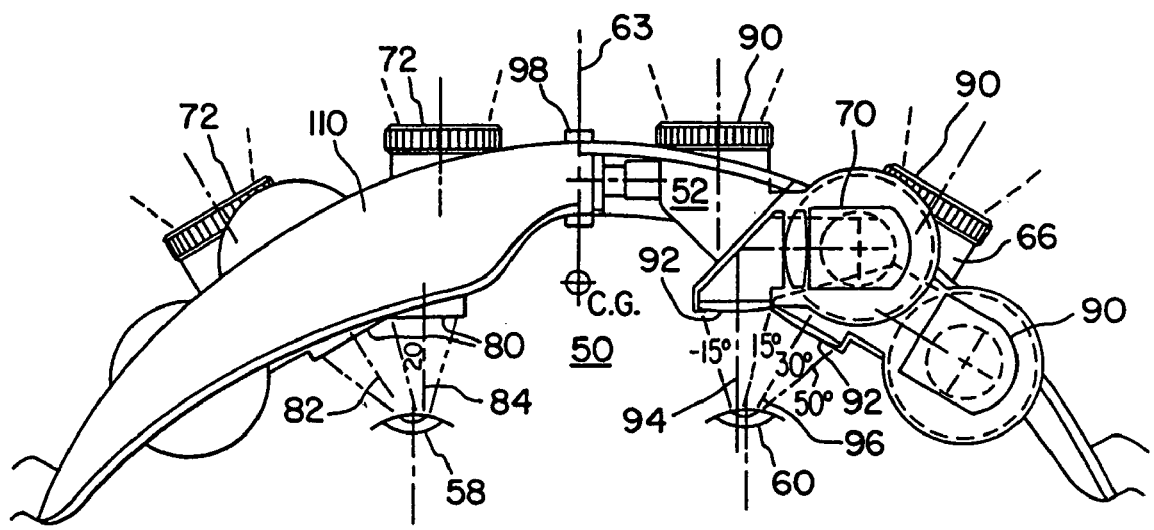
FIG. 11 is a bottom view of the binocular-like vision system of FIG. 10.

As shown in FIG. 11, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light simultaneously transmitted along the four optical axes 82, 84, 94 and 96 is schematically shown in FIG. 12. The field of view 100 is the result of having the sub-fields of view formed from the output ends 80 and 92 overlapping one another. The four sub-fields of view each are circular having a horizontal field of view of approximately 40 degrees and a vertical field of view of approximately 40 degrees. In a manner similar to that shown in FIG. 3, the field of view 100 includes two monocular portions 102, 104 and a 35-degree binocular portion 106. The field of view 100 has a vertical field of view of approximately 40 degrees and a horizontal field of view of approximately 100 degrees.

The above described binocular-like vision system 50 of FIGS. 10–15 has a mass of approximately 550 g, a limiting resolution of approximately 60 LP/mm, an eye relief of 20 mm min., a system gain of 3,000 min., and a system resolution of approximately 1.10 cy/mr min.

Note that each of the objective optical systems 62, 64, 86, 88 is mounted in and extends slightly through an opening provided in the visor 110 and is mounted to the visor 110 by suitable bearings or the like. Although the objective optical systems 66 are fixed in position in the visor 110, the eyepiece optical systems 70 are adjustable by adjustment knobs 116 (FIG. 10) to match the interpupillary distances of the users. The housings carrying the objective optical systems 66 are rotatable in their respective bearings to permit the eyepiece optical systems 70 to be adjusted in position. Various structural details and advantageous features of the visor-mounted panoramic night vision apparatus 50 of FIGS. 10–15 are described in detail in U.S. Pat. No. 5,416,315, the disclosure of such patent is hereby incorporated herein by reference.

The binocular-like vision system 50 of FIGS. 10–15 may also include a head-up display (HUD) unit 114 for the display of secondary information such as aircraft data and symbology to the pilot and crew. A combiner element 120 is used to superimpose HUD information onto the image-intensified scene of the right eye 58 so that they appear in the same plane. Thus, no change of the eye's distance adaptation is needed. The HUD information defines a rectangular region 122 of approximately 28 degrees wide by 20 degrees high in the field of view 100 centered on the user's forward-looking line of sight as shown in FIG. 13.

The HUD information is preferably provided in a contrasting color (e.g., yellow) to the green image intensified scene, and because the HUD and the image intensifier tube provide information in different colors, a dichroic combiner is used. As a result, the system will provide high brightness for both images without requiring excessive luminance from either of the two sources.

The head-up display 114 in FIGS. 10–11 and 14–15 is preferably an electroluminescent display although it may also comprise a liquid crystal display (LCD). In this regard, reference is made to U.S. Pat. No. 5,254,852, the entire contents of which are incorporated herein by reference, which describes the use of a liquid crystal display device for presenting a secondary image to a user in a night imaging system.

In general, the information presented on the electronic display is selected and formatted in a computer and is presented to the display subsystem as a nominal RS-170 or the like monochrome, on-off (no gray scale or with gray scale type) signal. The display panel is capable of producing a minimum of 480-row by 640-column to 1024×1080 (SVGA) pixel images. Since the combiner 120 is used, the HUD image is projected continuously and the user perceives yellow symbols overlaying the intensified image.

Incorporation of the HUD unit 114 into the panoramic night vision imaging apparatus 50 adds very little weight to the overall apparatus (e.g., about 65 grams); and, accordingly, the overall apparatus remains ejection safe with a minimal shift in the center of gravity of the total headborne weight.

In the embodiments described with reference to FIGS. 1–15, panoramic night vision imaging apparatus are described. As shown in FIGS. 17–23, the present invention may also be utilized in imaging apparatus that do not include image-intensifying means. The binocular-like vision systems 50 of FIGS. 17–23 generally have the same structure as and function like the system 50 previously described with respect to the systems 50 of FIGS. 1–15. One difference between the vision system 50 of FIGS. 1–15 and FIGS. 17–23 is that the light from the objective optical systems 66 will be transferred directly to the eyepiece optical systems 70 without being intensified by an image intensifier tube in the systems of FIGS. 17–23. Like the vision systems 50 of FIGS. 1–15, the vision systems of FIGS. 17–23 are able to produce an enlarged field of view by using two optical components per eye. The vision systems 50 of FIGS. 17–23 will produce a field of view that is larger than the 43-degree field of vision produced by the prior art binoculars of FIG. 16, which are a set of Jason 7×35 PermaFocus binoculars producing a horizontal field of view of 113 yards at a distance of 1000 yards.

The binocular-like vision systems 50 of FIGS. 17–23 include inner optical components 62, 86 and outer optical components 64 and 88, each component having identical optical structures for the objective optical systems 66 and the eyepiece optical systems 70. The objective and eyepiece optical systems 66 and 70 can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 160-mm. The eyepiece optical system 70 includes approximately 2 to 7 optical elements, such as plastic or glass lenses L, which have an effective focal length of approximately 25-mm. The lenses L of both the objective optical system 66 and the eyepiece optical system 70 are preferably spherical or aspherical in design.

Figure 21:
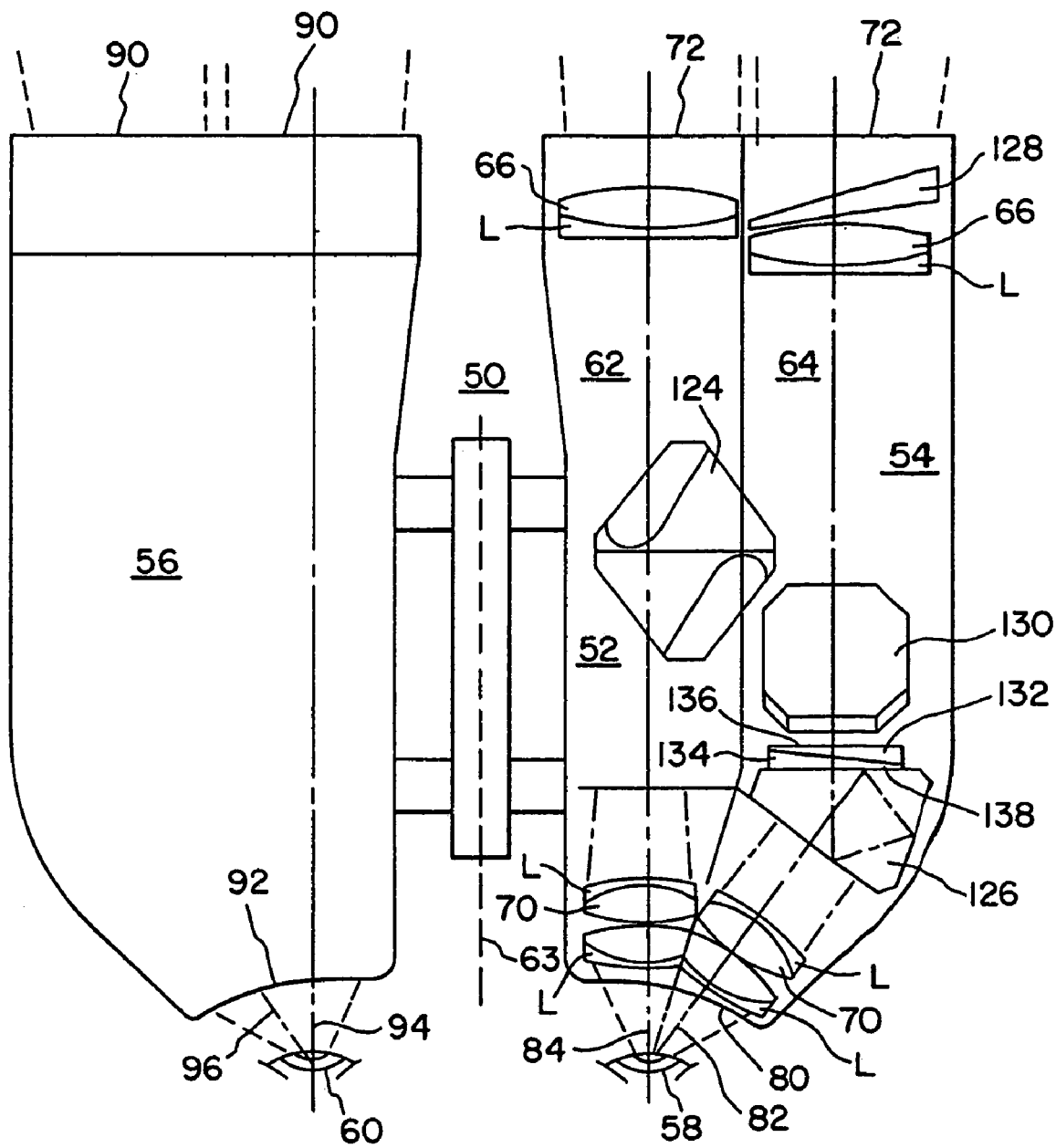
FIG. 21 is a partially exposed top view of the binocular-like vision system of FIG. 18.
Figure 22:
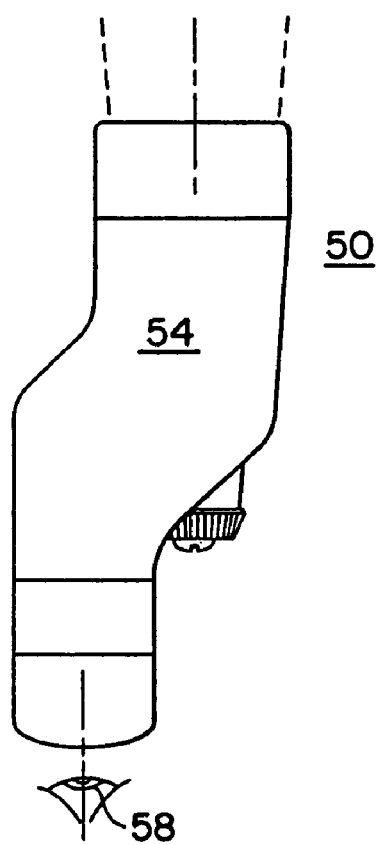
FIG. 22 shows a side view of the binocular-like vision system of FIG. 18.
Figure 23:
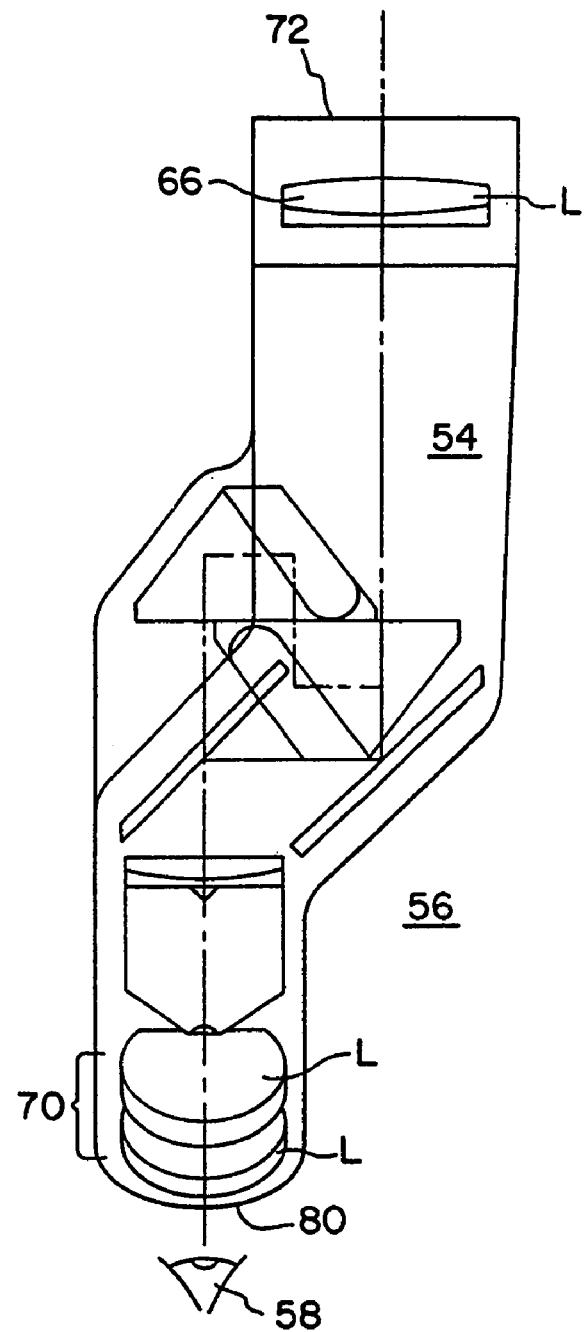
FIG. 23 shows an exposed side view of the binocular-like vision system of FIG. 22.

As shown in FIGS. 17 and 21, the light from the four objective optical systems 66 is transmitted to intermediate optical components 124 and 126 before entering the eyepiece optical systems 70. Optical component 124 preferably is a Porro prism that rotates the image from the inner optical components 62 and 86 by 180 degrees so as to present an upright image to the observer. Optical component 126 preferably is a Schmidt prism that rotates and bends the image from the outer optical components 64 and 88 so as to present an upright image.

As shown in FIGS. 17 and 21, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light transmitted along the four optical axes 82, 84, 94 and 96 shown in FIGS. 17 and 21 is similar to that shown in FIG. 6. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. The field of view 100 includes two monocular portions 102, 104 and a 35-degree binocular portion 106. The field of view 100 has a vertical field of view of approximately 50 degrees and a horizontal field of view of approximately 120 degrees. The binocular-like vision system 50 of FIG. 17, for example, theoretically produces a horizontal field of view of 495 yards at a distance of 1000 yards. The vision system 50 of FIGS. 18–23 produces a horizontal field of view of 1058 feet at 1000 yards.

As in previous embodiments of FIGS. 1–15, the eyepiece optical systems 70 in each housing 54 and 56 are positioned adjacent to each other so that the overall panoramic image appears continuous without a noticeable line of demarcation between the exit elements of the eyepiece.

The vision system 50 of FIGS. 18–23 differs from the vision system 50 of FIG. 17 in several ways. First, the outer components 64 and 88 of the vision system 50 of FIGS. 18–23 each include a wedge-shaped lens 128 inserted at the input end 72. The lens 128 deflects the line of vision entering the outer components 64 and 88 in a well-known manner. The outer components 64 and 88 further include a mirror 130 that directs light from the objective optical system 66 to a pair of wedged-shaped lenses 132 and 134 that are located adjacent to the prism 126. As shown in FIG. 21, the lenses 132 and 134 are arranged on each other to form parallel input and output sides 136 and 138, respectively. The lenses 132 and 134 correct the color generated by the lens 128.

An even further embodiment of the invention is shown in FIGS. 24–29 intended particularly for use in connection with flights having no high G considerations, such as helicopter and transport flights. In such a setting where there is no ejection capability, there is less concern for reduced center of gravity. A vision system 150 is shown having an input end (172, 190) that receives light from an object and an optical transfer system (162, 164, 186, 188) that receives the light received from the input end and transfers the received light to an output end (180, 192) of the system, wherein light transmitted out of the output end forms a field of view of the object that is greater than a 60-degree horizontal field of vision. Studies by the U.S. Army suggest that the most efficient field of view for night aviation is about 80 degrees. It is a common problem in night vision, however, that increasing the field of vision adversely affects resolution. The system of this invention enhances both factors.

Figure 24:
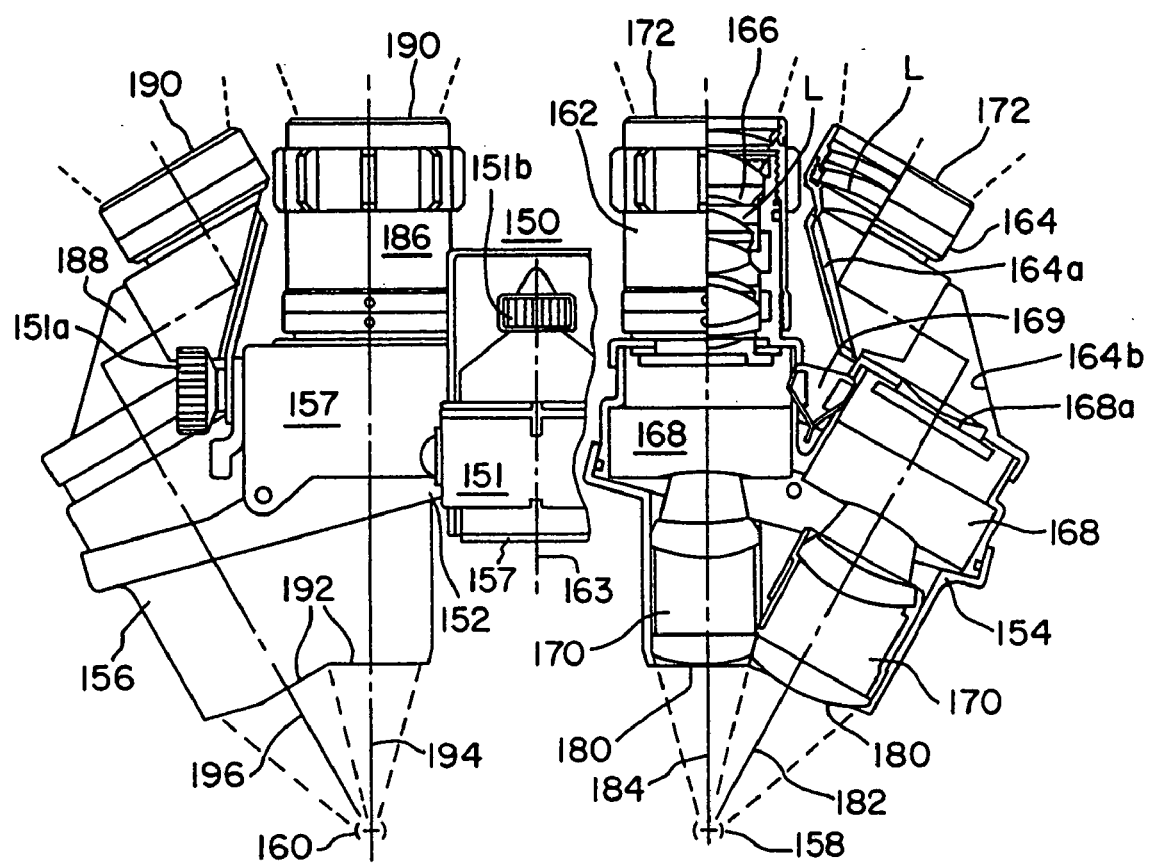
FIG. 24 is a top view of a binocular-like vision system according to a seventh embodiment of the present invention.

FIG. 24 shows the further embodiment of a binocular-like vision system 150 contained in a housing assembly 152 having a pair of housings 154 and 156 connected to one another by a bridge 157. Housings 154 and 156 are arranged for respectively covering the right eye 158 and the left eye 160 of an observer.

Figure 25:
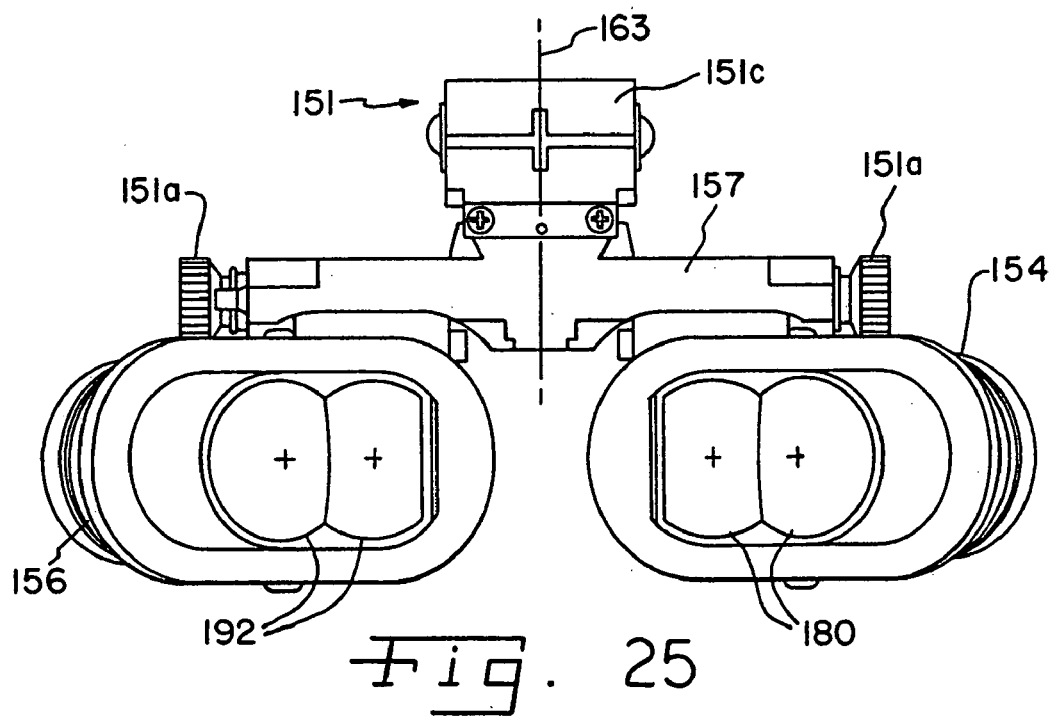
FIG. 25 is a rear view of the binocular-like vision system of FIG. 24.

Each of housings 154 and 156 contains identical optical systems which are mirror images of each other about a plane 163 (denoted by dashed lines) that bisects the housing assembly 152 as shown in FIGS. 24 and 25. Accordingly, the discussion to follow regarding the housing 154 is equally applicable to the housing 156.

As shown in FIG. 24, the housing 154 includes two separate optical components 162 and 164. The inner optical component 162 has the identical optical structure as the inner optical component 186 of housing 156. Accordingly, the discussion to follow regarding the structure of the inner optical component 162 is equally applicable to the optical component 186. The inner optical component 162 includes three main optical structures—(1) an objective optical system 166, (2) an image intensifier tube 168 and (3) an eyepiece optical system 170. The objective optical system 166 defines an input end 172 that receives light from an object and includes intensifier tube 168. The objective optical system 166 defines input end 172 that receives light from an object. The objective optical system 166 includes output light from the image intensifier tube 168 that is emitted by a green phosphor producing a visible band of light which is known as "P-20" or "P-43" light, although it will be appreciated that other image intensifier constructions could also be used.

The image intensifier tube 168 is defined by a new 16-mm format, high-resolution, tube that is lighter in weight than the conventional 18-mm tube. Because four tubes are utilized in this system, as compared to the two 18-mm tubes used in conventional design, it is critical that the 16-mm takes 168 be much lighter suitable tubes are available from ITT Night Vision Roanoke, Va. Tube 168 includes a fiber optic bundle well-known in the art for transmitting bits of image data from a photocathode input end to a phosphor output end thereof in the manner very similar to that described above in relation with the embodiments shown and described in relation to FIGS. 1–23. The fiber optic bundle is preferably twisted in a manner well known in the art to provide an image rotation of 180 degrees so that an upright image of the object will be presented to the eye of the observer.

The intensified visible output image generated by the image intensifier tube 168 is transferred to an output end 180 of the inner optical component 162 via the eyepiece optical system 170. The light transmitted through the output end 180 is transmitted along the optical axis 184 that is aligned with the optical axis of the right eye 158. The eyepiece optical system 170 can be of conventional design, such as disclosed in U.S. Pat. No. 5,416,315, the entire contents of which are incorporated herein by reference. The eyepiece optical system 170 includes approximately 2 to 7 optical elements, such as plastic or glass lenses L, which have an effective focal length of approximately, 24 mm, P/1.2. The lenses L of the objective optical system are preferably spherical or aspherical in design.

In order to enlarge the field of view, outer optical component 164 is provided to also direct light from the object to the observer. Outer optical component 164 includes an image intensifier tube and 168 an optical arrangement substantially similar to the folded objective optical system 66 shown and described above in relation to FIGS. 10 and 11 above, which can be of a design disclosed in U.S. Pat. No. 5,416,315. Outer optical component 164 includes approximately 2 to 7 optical elements, such as plastic or glass lenses L, which have an effective focal length of approximately 24-mm. The lense L of optical component 164 are preferably spherical or aspherical in design. The folded optical path of the outer components 164 and 188 allows their respective input ends to be spaced laterally closer to the input ends of inner components 162 and 186 to reduce parallax.

The above-described outer optical component 164 operates in a manner such that the input end 172 of the outer optical component 164 receives light from an object. The received light is then transferred via the objective optical system via a mirror 164a and subsequently a prism 164b to the input end of the image intensifier 168 defined by a field flattenen lense 168a. Image intensifies to be 168 generates an intensified image that is received by the eyepiece optical system 170. The eyepiece optical system 170 then sends the image to an output end 180 of the outer optical component 164. The light transmitted through the output end 180 travels along an optical axis 182 that is offset from the optical axis 184 of inner optical component 162 by an angle ranging from approximately 30 degree to 35 degree and which is preferably about 30 degrees. Electrical power is provided to both tubes 168 of components 162 and 164 by electrical wiper contact 169.

As stated previously, the inner optical component 186 for the left eye 160 has the same structure and operates in the same manner as the inner optical component 162. Similarly, the outer optical component 188 for the left eye 160 has the same structure and operates in the same manner as the outer optical component 164. In other words, the inner and outer optical components 186 and 188 of housing 156 each receive light from an object at the input ends 90 and transfer their images of the object to respective output ends 192. As shown in FIG. 24, the image from the inner optical component 186 passes through an intensifier tube which is then projected along an optical axis 194 that is aligned with the optical axis of the left eye 160 and, thus, substantially parallel to the optical axis 184. The image from the outer optical component 188 is ultimately projected along an optical axis 196 that is offset from the optical axis 194 by an angle ranging from 30 degrees to 35 degrees, preferably approximately 30 degrees.

As shown in FIG. 25, the two eyepiece optical systems 170 for each of the housings 154 and 156 are positioned adjacent to each other so that both images at the output ends 180 and 192 appear continuous without a noticeable line of demarcation between the exit elements of the eyepiece optical systems. With respect to the forward looking direction, the two adjacent eyepiece optical systems for each housing 154 and 156 provide a continuous horizontal field of view that begins about 50 degrees to the right (or to the left) and ends 15 degrees to the left (or to the right).

As shown in FIGS. 24 and 25, the optical systems are in line with the line of sight of the observer's eyes 158 and 160. The apparatus also includes a well-known ANVIS mounting system 151 to, in a standard fashion, attach the night vision goggles of the present invention to the standard-issue pilot's helmet. Mounting system 151 commonly includes a mechanism 151a for adjusting the interpupillary distance between the eyepiece optical systems in the two housings 54 and 56 to accommodate different users. Mechanism 151b is an adjustment dial for adjusting the fore/aft position of the system. The entire vision system 150 and bridge 157 are detachably affixed to the pilot's helmet via mechanism 151c that is a well-known element of the ANVIS system.

The inner two objectives 166 and 186 of vision system 150 are focus-adjustable 18 inches to infinity, and the outer optical components 168 and 188 are fixed at infinity. The inner optical channels are not folded and are designed with fast F/1.05 objective lenses. The outer channels 168 and 188 employ a folded channel optics design with F/1.17 objective lenses to reduce parallax and size. The effective focal length of the eyepiece is 24.0 mm, while the eye relief has been increased to 30 mm. All of the mechanical adjustments currently used on the AN/AVS-6 and AN/AVS-9 are the same (i.e., tilt, independent inter-pupillary distance adjustment, up/down, fore/aft) and the like.

Figure 26:
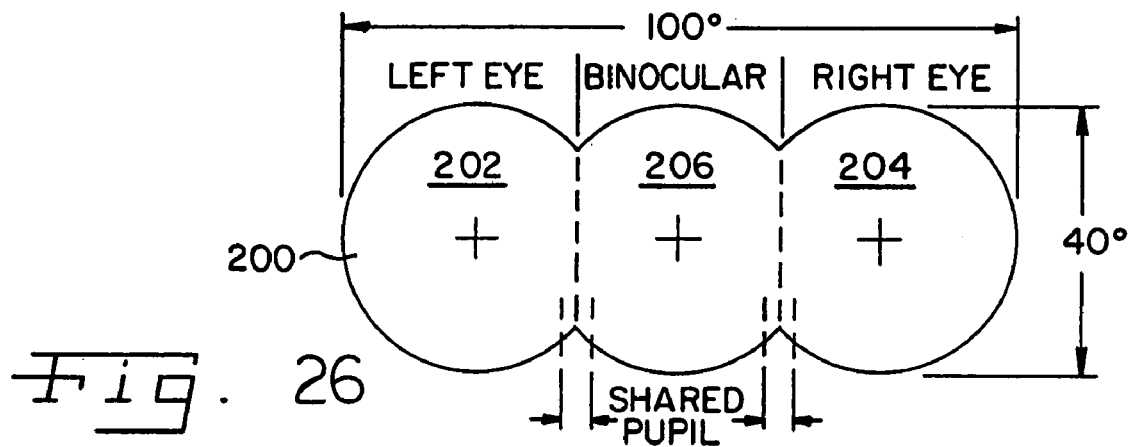
FIG. 26 schematically shows the field of view generated by the binocular-like vision system of FIG. 24.

The field of view 200 generated by the light simultaneously transmitted along the four optical axes 182, 184, 194, 196 to the observer is schematically shown in FIG. 26. The field of view 200 is the result of having the sub-fields of view formed from each of the output ends 180 and 192 overlap one another. As shown particularly in FIG. 26, each of the four sub-fields of view are circular having a horizontal field of view of approximately 40 degrees and a vertical field of view of approximately 40 degrees. The field of view 200 includes two peripheral portions 202 and 204 that are separated from one another, wherein each portion 202 and 204 has a monocular effect on the observer. The field of view 200 includes an overlapping central portion 206 spanning approximately 30 degrees. The central portion 206 is positioned between the monocular portions 202 and 204 and is viewed by both eyes 158 and 160 of the observer so as to provide full depth perception and exact stereo vision in the central portion. The field of view 200 has a vertical field of view of approximately 40 degrees and a horizontal field of view of approximately 100 degrees.

Figure 27:
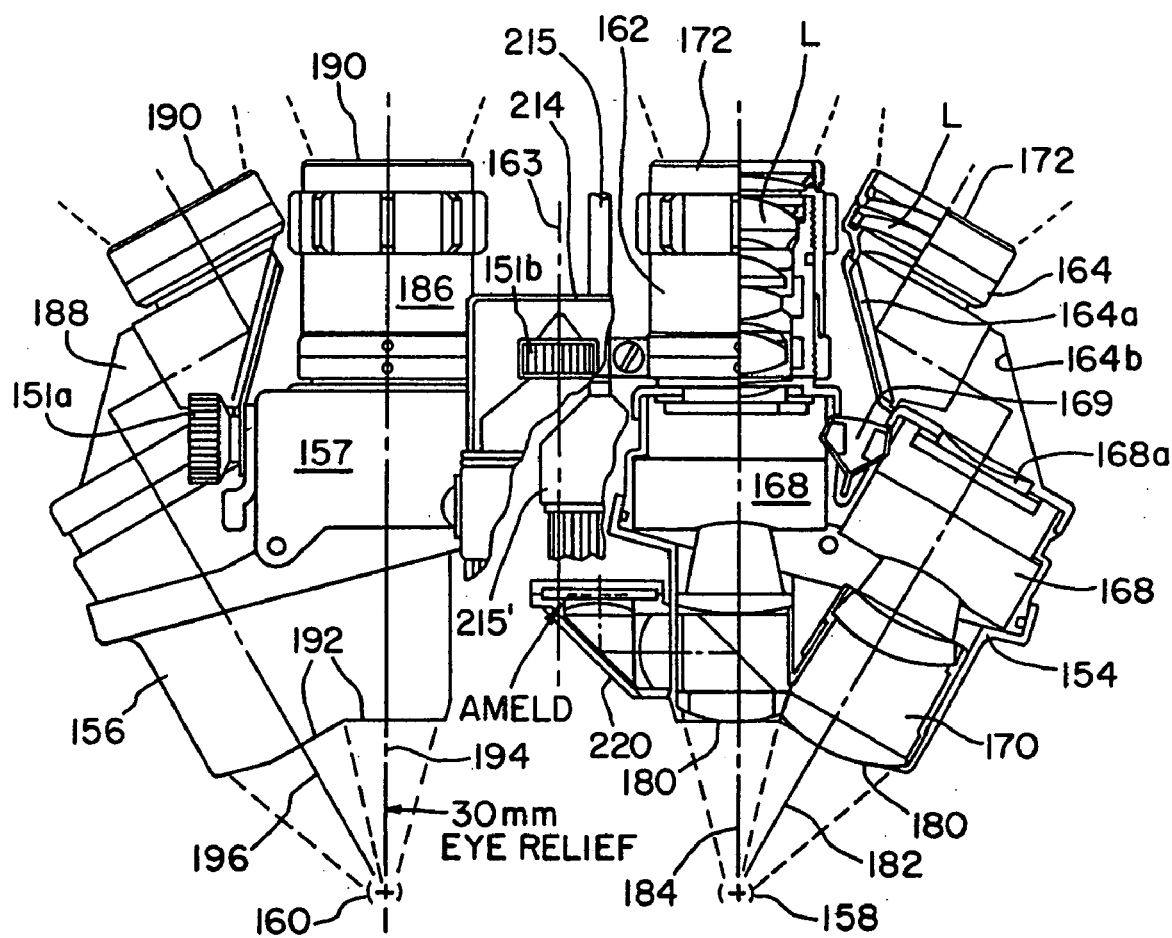
FIG. 27 is a top view of the binocular-like vision system of FIG. 24 including a head up display (HUD)
Figure 28:
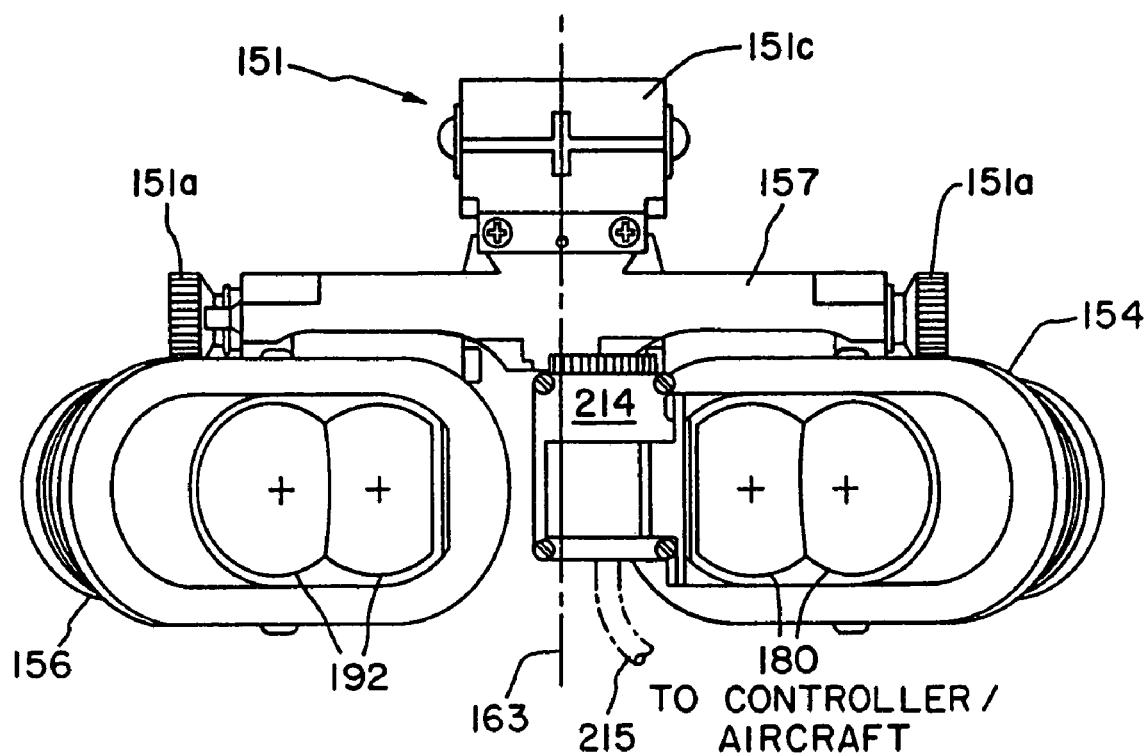
FIG. 28 is a rear view of the binocular-like vision system of FIG. 27.
Figure 29:
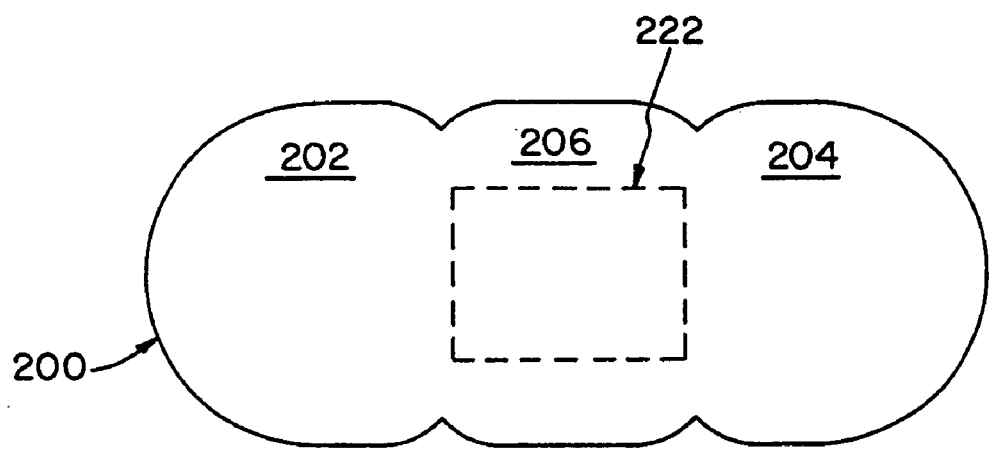
FIG. 29 schematically shows the field of view generated by the binocular-like vision system of FIG. 27 including a HUD unit.

The binocular-like vision system 150 of FIGS. 27 and 28 may also include a head-up display (HUD) unit 214 for the display of secondary information such as aircraft data and symbology to the pilot and crew. A beam combiner element 220 is used to superimpose HUD information onto the image-intensified scene of the right eye 158 so that they appear in the same plane. Thus, no change of the eye's distance adaptation is needed. Combiner 220 reflects 10% of the light while transmitting 90%. HUD 214 is coupled to the control system of the aircraft via cable 215. The date the aircraft controller is transmitted by way of flexible multi-conductor connector 215' complying the HUD with the objective. The HUD information defines a rectangular region 222 of approximately 28 degrees wide by 20 degrees high in the field of view 200 centered on the user's forward-looking line of sight as shown in FIG. 29.

As with the HUD system of the alternative embodiments described above, the HUD information is preferably provided in a contrasting color (e.g., yellow) to the green image intensified scene, and because the HUD and the image intensifier tube provide information in different colors, a dichroic or part silver type combiner is used. As a result, the system will provide high brightness for both images without requiring excessive luminance from either of the two sources.

The head-up display shown in FIGS. 27 and 28 is commonly referred to as AMELD (active matrix ectroluminescent display), although it may also comprise a liquid crystal display (LCD). In this regard, reference is made to U.S. Pat. No. 5,254,852, the entire contents of which are incorporated herein by reference, which describes the use of a liquid crystal display device for presenting a secondary image to a user in a night imaging system. In general, the information presented on the electronic display is selected and formatted in a computer and is presented to the display subsystem as a nominal RS-170 or the like monochrome, on-off (no gray scale or with gray scale type) visor-mounted panoramic night vision apparatus 50 of FIGS. 10–15 are described in detail in U.S. Pat. No. 5,416,315, the disclosure of such patent is hereby incorporated herein by reference.

The binocular-like vision system 150 of FIGS. 24 and 25 has a mass of approximately 600 g, a limiting resolution of approximately 64 LP/mm, an eye relief of 30 mm min., a system gain of 8,000 min., and a system resolution of approximately 1.3 cy/mr min. The binocular-like vision system 150 of FIGS. 27 and 28 including the HUD element has a mass of approximately 650 g, a limiting resolution of approximately 64 LP/mm, an eye relief of 30 mm min., a system gain of 7,000 min., and a system resolution of approximately 1.3 cy/mr min.

Figure 30:
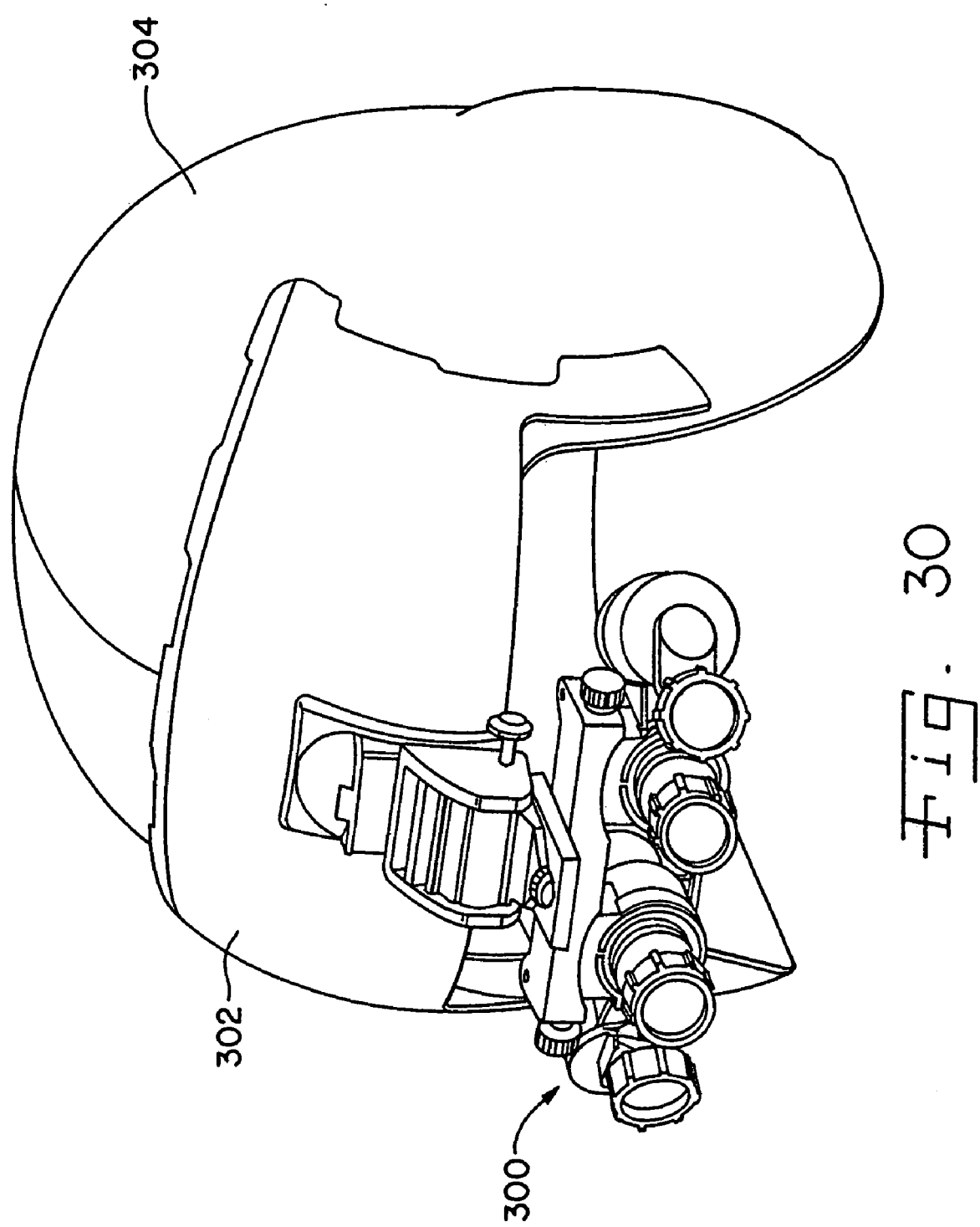
FIG. 30 is a front perspective view of a modular embodiment of this invention mounted to a helmet visor.
Figure 31:
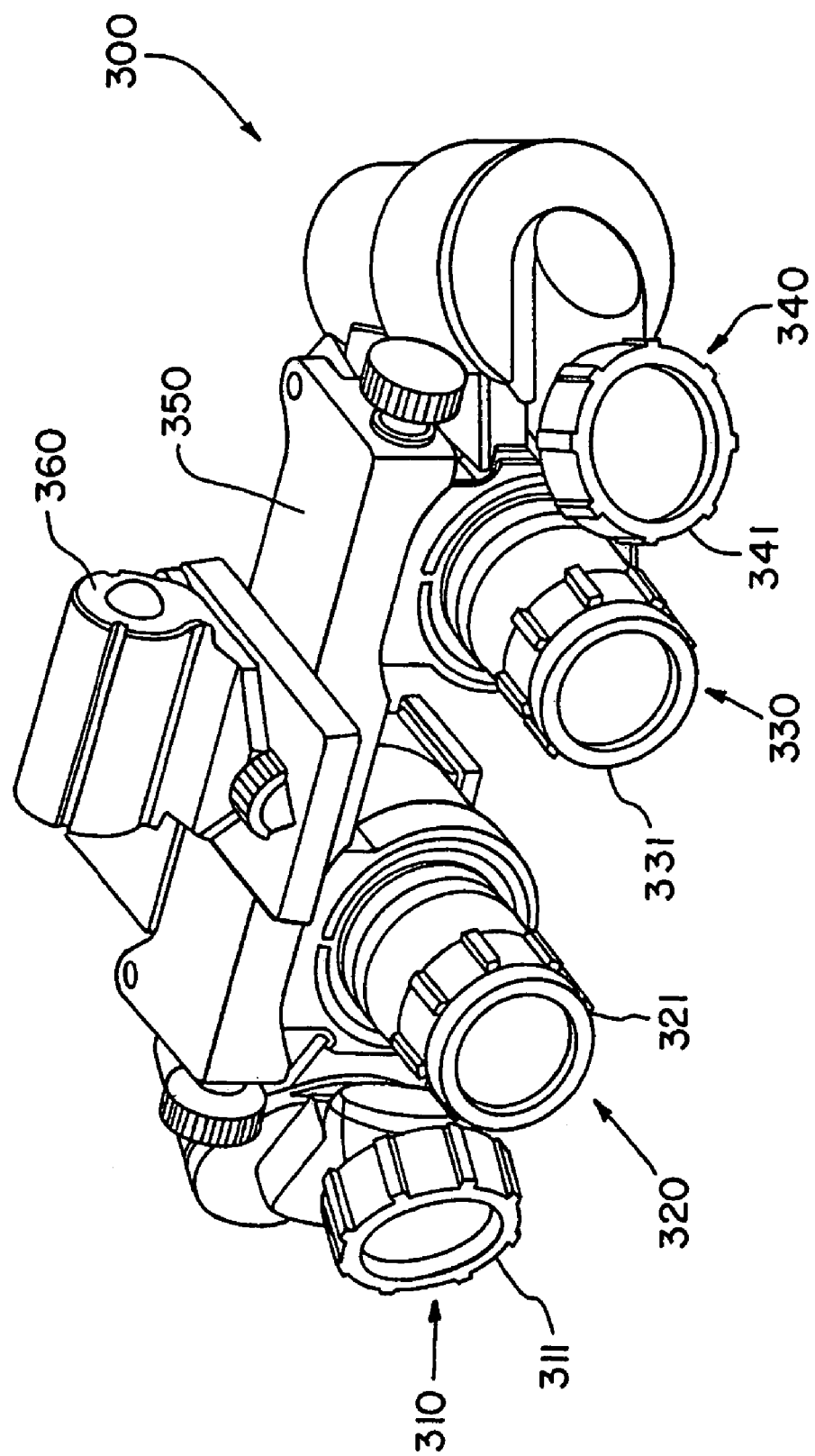
FIG. 31 is a front perspective view of the modular embodiment of this invention in isolation.
Figure 37:
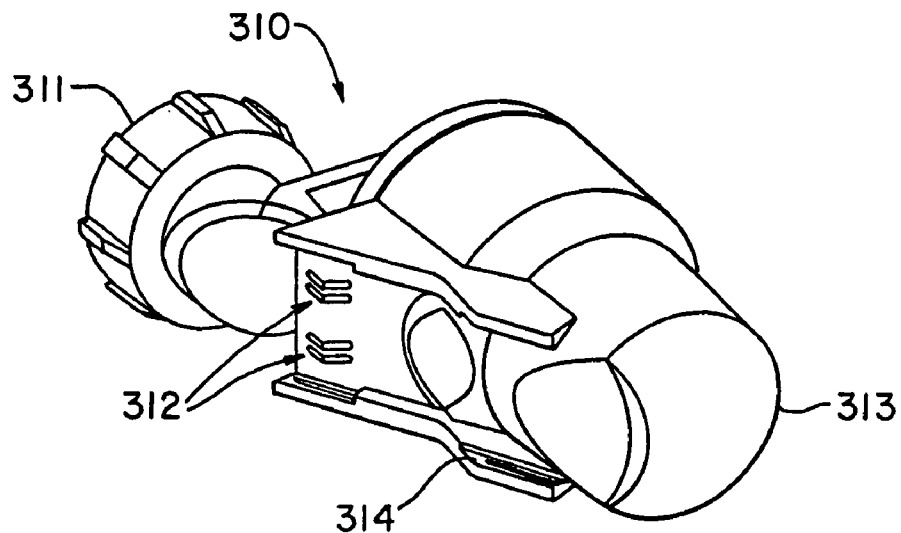
FIG. 37 is a perspective view of an outer optical module of this invention shown in isolation.

FIGS. 30–40 present yet another embodiment of the PNVG goggle, designed so that the individual optical channels are modular and thus detachable from each other. FIGS. 30 and 31 show the modular PNVG assembly 300 of this invention mounted on the visor 302 of an HGU-56/P helmet 304. Modular assembly 300 may be affixed to the visor 302 by conventional means. Each of the 4 optical channels 310, 320, 330, 340 is a separately sealed and self-contained module. Removal of any single module from the PNVG assembly 300 will not break any pressure seals or degrade the optical performance of the removed module or any of the remaining modules. Electrical power and information (i.e., data signals and the like) required by a module is provided through electrical connector means provided between the modules. Such means could include, for example, wiper contacts 312 provided on outer optical module 310 as shown in FIG. 37, and contact pads 328, 338 provided on inner optical modules 320, 330, respectively, as shown in FIG. 39.

The modules include attachment means that ensures proper positioning and alignment of the adjacently mating modules. As shown best in FIGS. 37 and 39, such attachment means may include tongue-and-groove type connectors 314, 324, 334, by which each module is slidably received by and secured to an adjacent module. While in a preferred embodiment the integral electrical connector contained within each module (such as wiper contacts 37 and relays 328 and 338) enables the electrical connection between adjacent modules to be made simultaneously with the mechanical attachment of the module, the electrical and data connections may be made separately by way of, for example, cable connectors or the like extending between adjacent modules.

In addition to the modularity of the four primary optical channels of the PNVG assembly 300, a display 360 (i.e., HUD) and a camera 370 are modular as well. Similar to the individual optical modules, each of these components 360, 370 are separately sealed and self-contained modules as well. Camera 370 may be of a type used conventionally with helmet assemblies for flight operations. Removal of the display 360 or camera 370 will not break any pressure seals or degrade the performance of the removed module or of any of the remaining modules. Again, electrical power and information (i.e., data signals and the like) required by the camera or display is provided by electrical connector means provided on each module.

Figure 38:
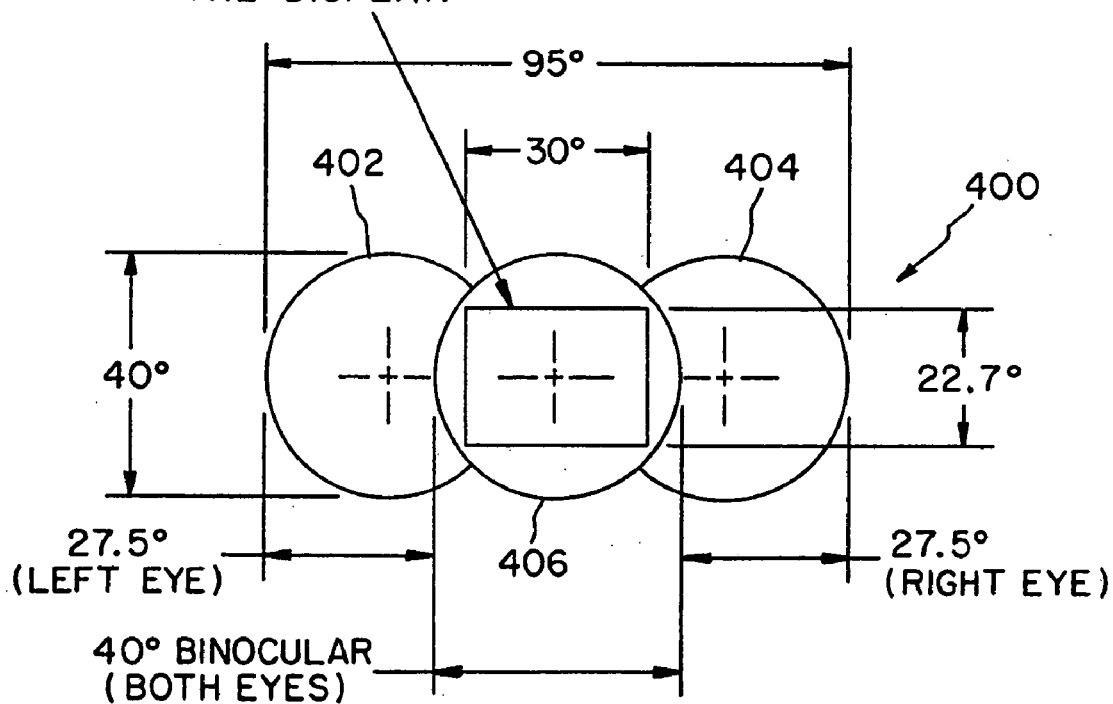
FIG. 38 schematically shows the field of view generated by the modular embodiment of this invention.
Figure 40:
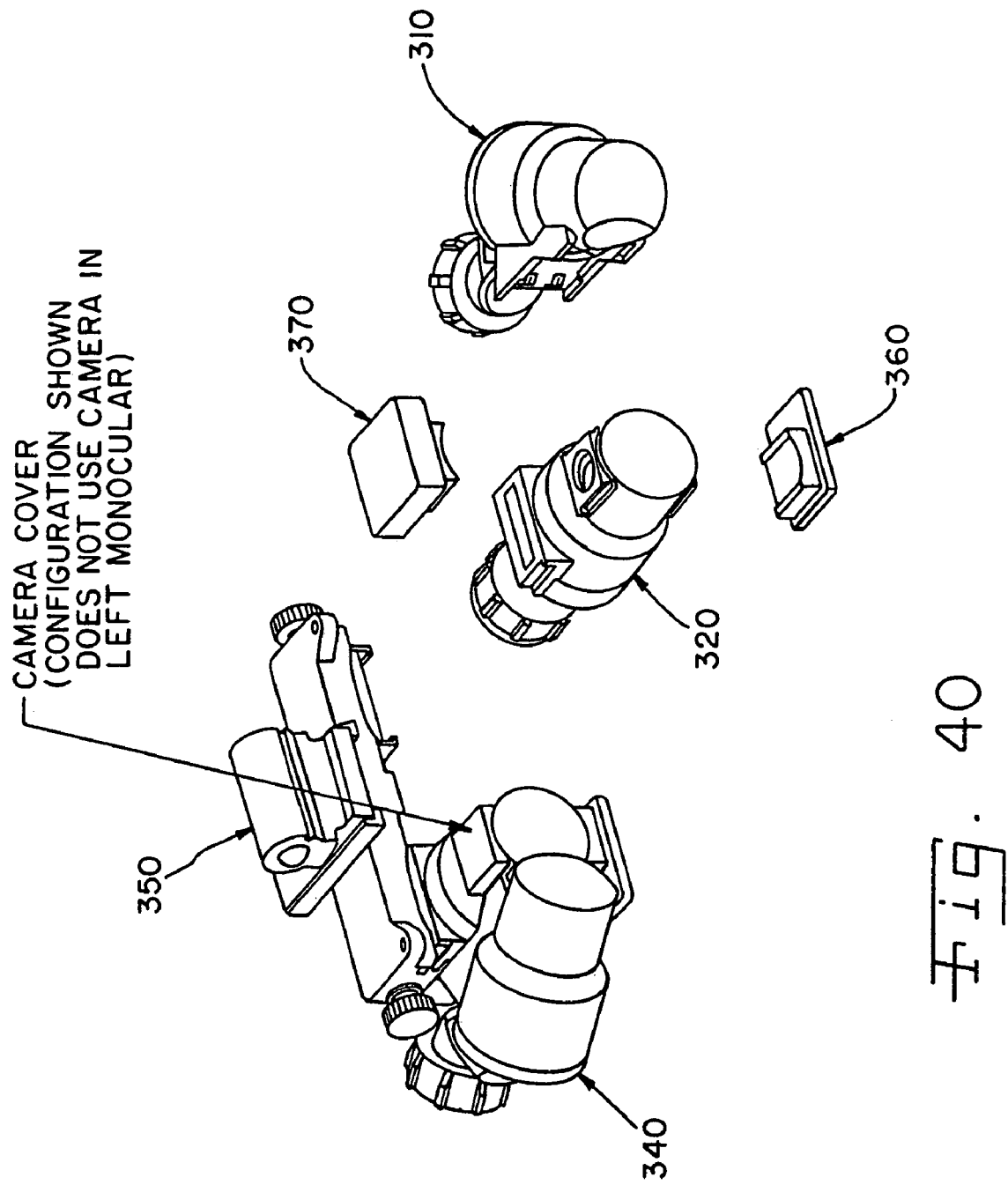
FIG. 40 is an exploded view showing the separate module elements forming the modular panoramic night vision assembly of this invention.

The field of view 400 generated by the light simultaneously transmitted along the four optical axes of the modular components 310, 320, 330, 340 is schematically shown in FIG. 38. The field of view 400 is the result of having the sub-fields of view formed from the output ends of the modules overlapping one another. The field of view 400 includes two monocular portions 402, 404, and a 40-degree binocular portion 406. The field of view 400 has a vertical field of view of approximately 40 degrees and a total horizontal field of view of approximately 95 degrees.

The outer optical modules are identical and interchangeable. Such a module may be simply turned or flipped 180° to serve as the right outer or left outer module. The right inner and left inner modules are dedicated and are not interchangeable.

Figure 33:
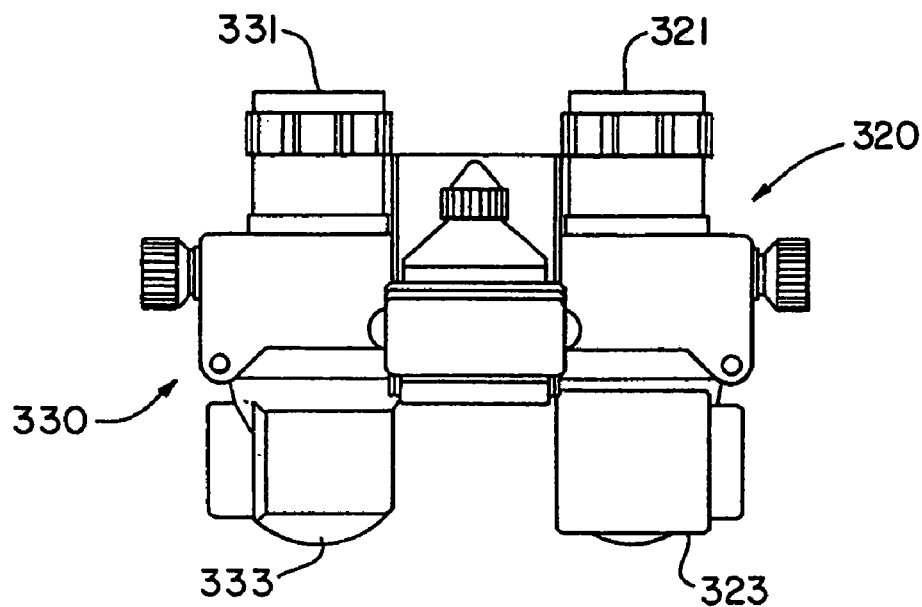
FIGS. 33 and 34 present top and rear plan views, respectively, of the modular embodiment of this invention showing the outer optical modules detached.
Figure 34:
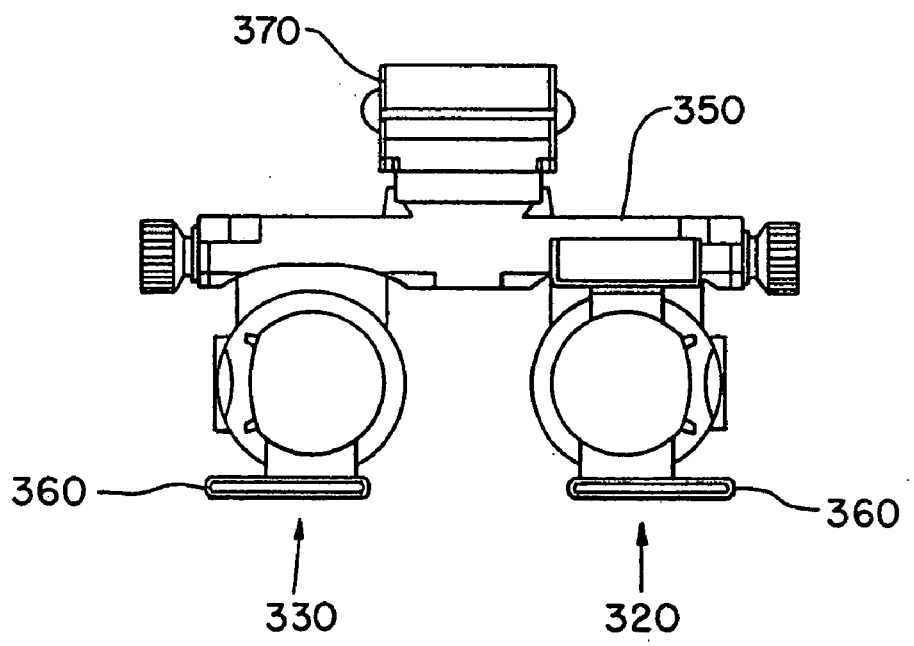
Figure 35:
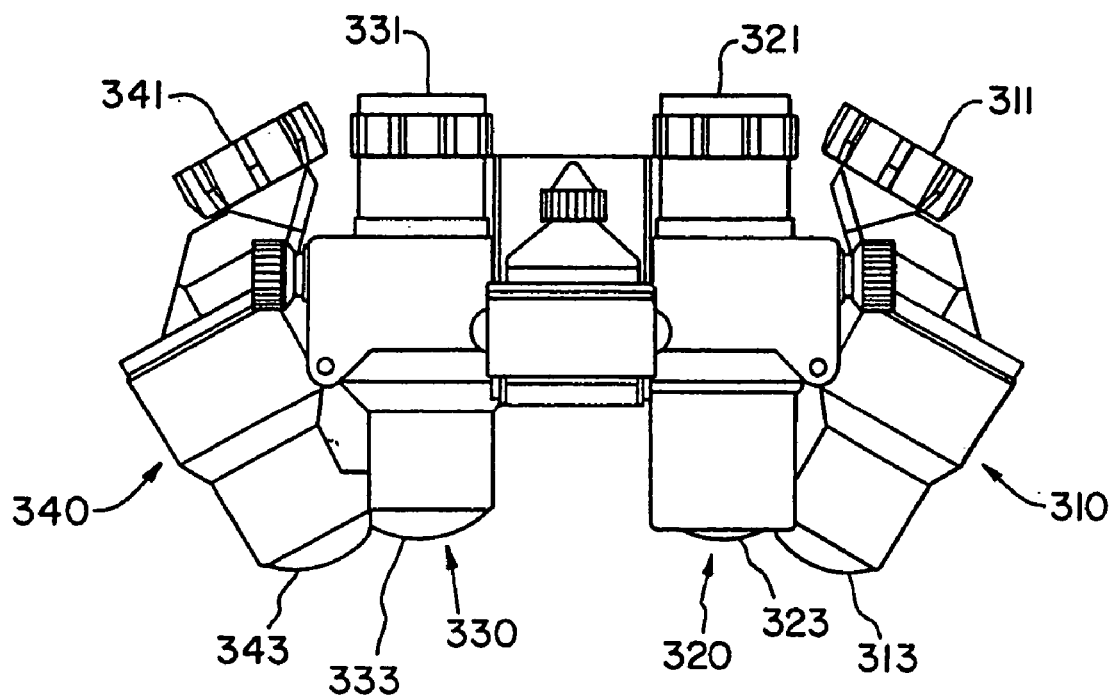
Figure 36:
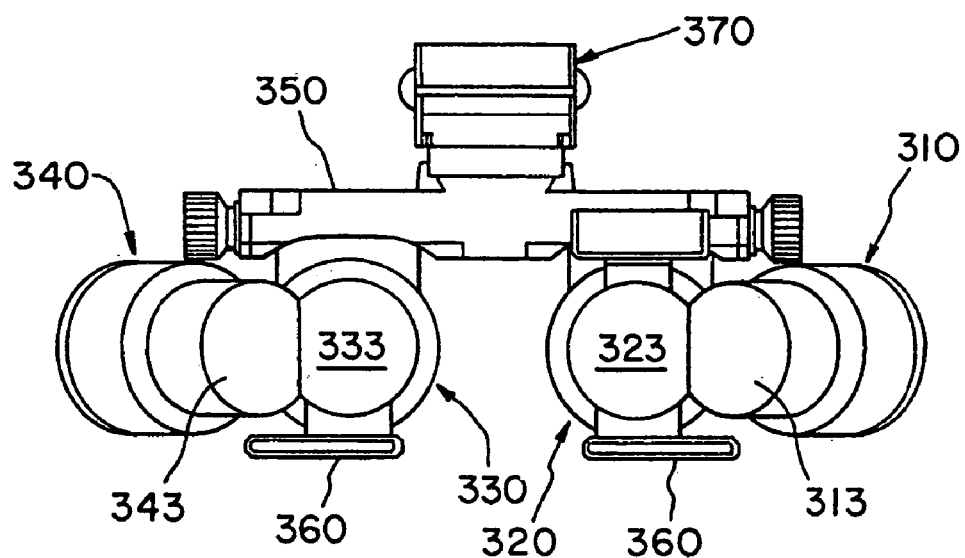

A significant advantage provided by the modularity of this invention is that one can employ if desired merely the dual-channel embodiment of this assembly as shown in FIGS. 33 and 34, comprising only the inner optical modules 320, 330 and the bridge 350. Such an embodiment may also include the display 360 and camera 370 if desired. This allows an end user to purchase only the dual-channel version as its budget permits and, as needed or as finances permit, to purchase separately one additional component, the universal outer optical module, to convert the dual-channel system to panoramic. This is particularly beneficial for developing countries with limited military budgets. This also allows the dual-channel assembly to be used by persons needing no or low light condition visibility but who do not need panoramic capability, such as the aircraft or ground crew other than the pilot(s).

From an operations standpoint, each optical module operates in a manner similar to that of the non-modular optical channels discussed in the previous embodiments. Thus, each optical module is designed to receive light from an object being viewed at an input end 311, 321, 331, 341, and to transfer an image of the object to the input end of an internal image intensifier means (not shown). The image intensifier means makes it possible for the observer to view an object in dark conditions by receiving the visible and/or infrared light image of the object transferred to the input end thereof. The image intensifier means converts the received image to an intensified visible output image in a predetermined narrow band of wavelengths at its output end. For example, the image intensifier means may include a GaAs photocathode at its input end. An optical transfer system that receives the light received from the input end then transfers the received light to an output end 313, 323, 333, 343 of each module.

A further preferred embodiment of a night vision goggle system of this invention utilizes a spectral beamsplitter to enhance the low-light level sensitivity and resolution of the system, to enable the night missions to be recorded for later analyses, to transmit the video images of the night scene to a remote location in real time, and to insert or overlay the intensified image with images from other sensors and/or data Referring now to FIG. 41, such an embodiment comprises a system 500 shown schematically including a dichroic type narrow-band-pass filter 502 used as a beamsplitter located inside the NVG eyepiece. This filter 502 is combined with appropriately aligned polarizers 504, 506 and rotators 508, 510 to direct the intensified images of the night scene for recording, transmitting or further video processing. A miniature video camera 512 captures the intensified scene, which in normal light levels allows the video to be recorded or transmitted to other remote locations.

Figure 41:
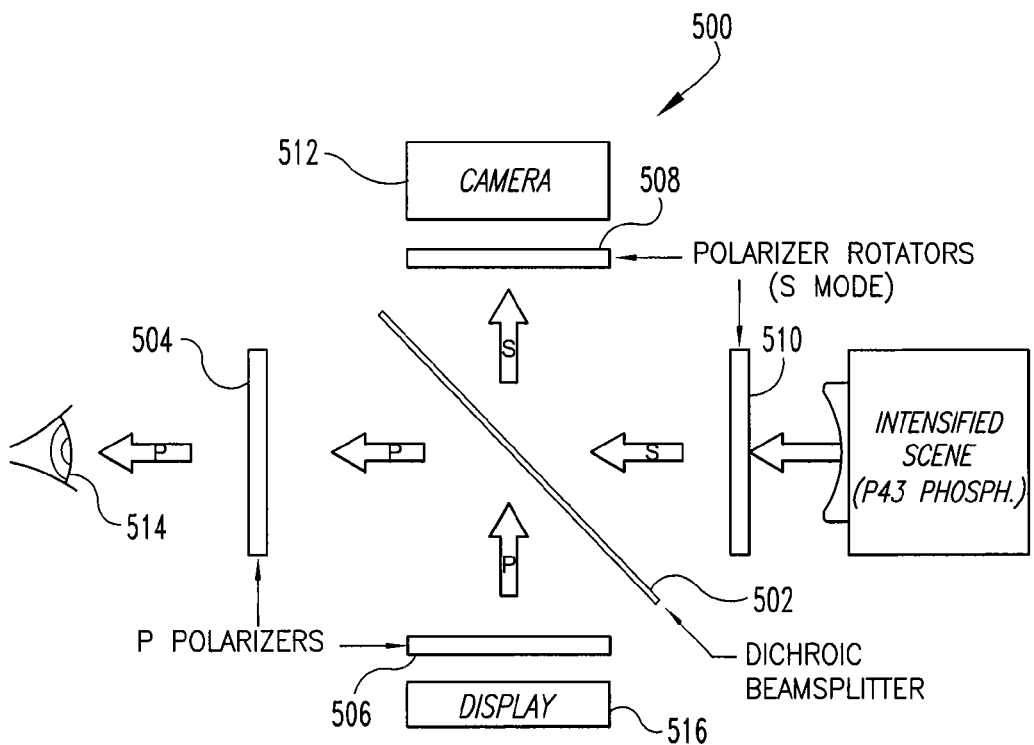
FIG. 41 is a schematic illustration showing operation of the beam splitter, polarizers and rotators in the low light level mode.

In this "direct view" mode, as shown in FIG. 41, polarizers 504, 506 and rotators 508, 510 are aligned in a "P" orientation. The light from the image intensifier passes through the shutter 510 (the L.C.-type shutter rotates rectangle area about 30°×22.5° size) but only the central band of the P43 phosphor (538 to 553 nm) passes through the beamsplitter 502 and through the second polarizer 504 to tile user's eye 514. Since all NVG eyepieces use only the central (green) band of the P43 phosphor, the sidebands must be filtered out (because of chromatic aberrations) and not be allowed to reach the user's eye. These sidebands contain up to 74% of the light energy relative to the central band and are normally "wasted" in present night vision goggle filter systems. The dichroic type beamsplitter 502 reflects all these side bands to the miniature CCD camera 512 for recording or transmitting the real-time images to other locations.

Figure 42:
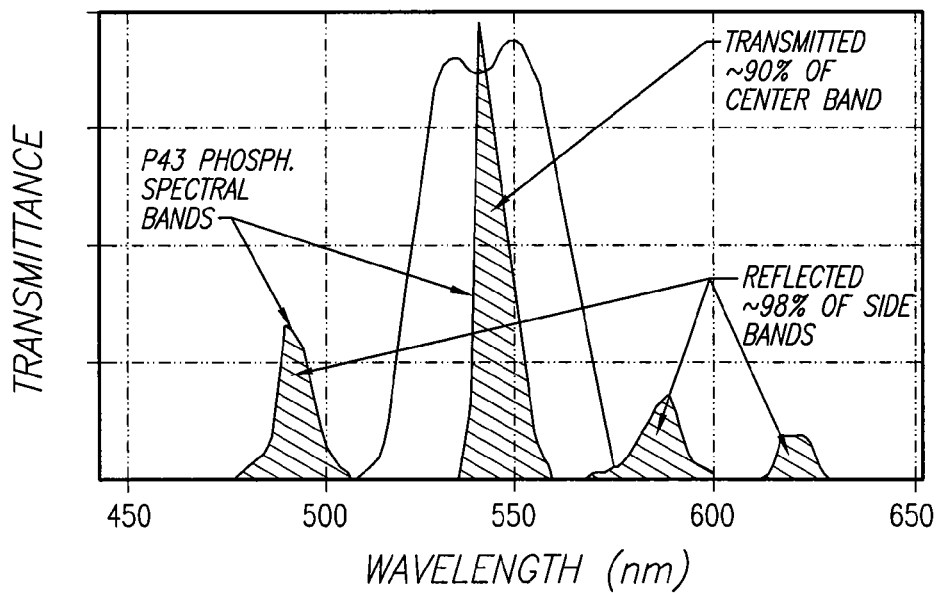
FIG. 42 graphically depicts the wavelengths of light energy transmitted through and reflected by the beam splitter of the invention.

FIG. 42 graphically depicts how the beamsplitter 502 reflects completely those side bands of the image intensifier P43 phosphor that should not be transmitted by the eyepiece.

The rotator 508 in the camera channel is aligned with the shutter polarizer 510 as well as the display channel polarizer 506, thus providing the capability to record and transmit the overlaid symbology or any image projected by the display channel 516. These recorded and transmitted images are identical to the images as seen by the user.

Figure 43:
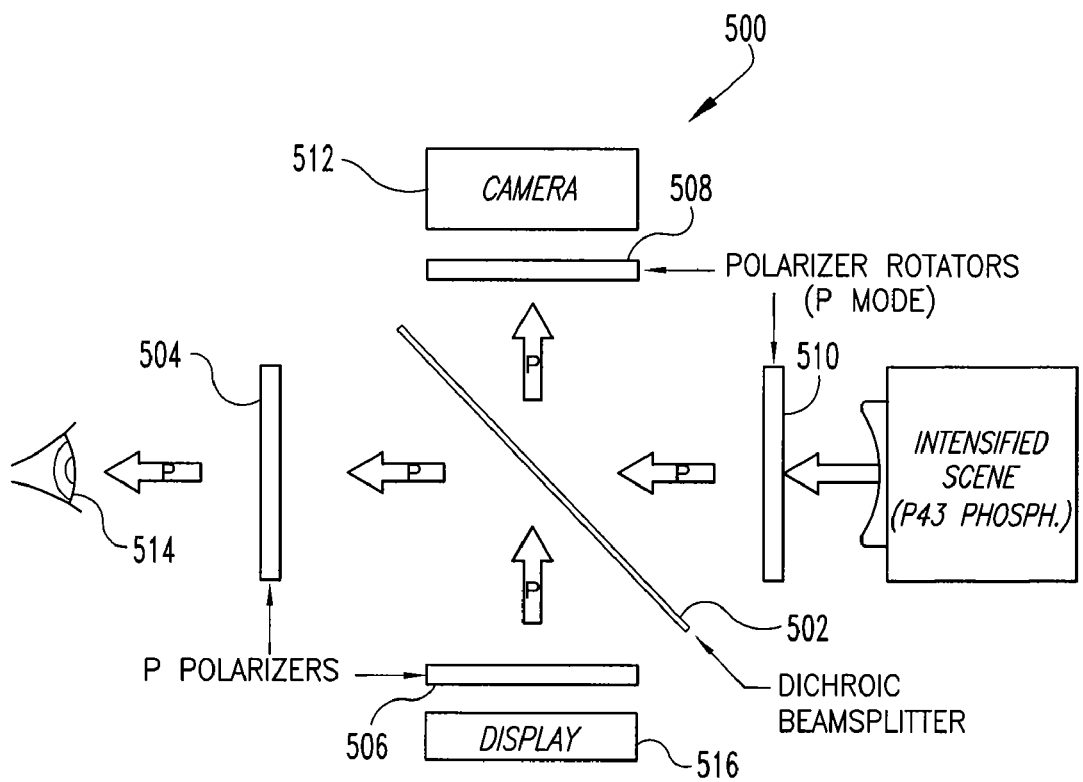
FIG. 43 is a schematic illustration showing operation of the beam splitter, polarizers and rotators in the enhanced low light level (ELLL) mode.

In the enhanced low light level (ELLL) mode, as schematically shown in FIG. 43, the shutter rotator and camera rotator 508 are energized and rotated to an "S" orientation, thus preventing the light from the image intensifier from being seen directly by the user. Similarly, the display image is blocked by the polarizer 508 of the camera 512 from entering the camera system in order to prevent undesirable feedback. In this ELLL mode, the intensified image is received by the camera 512. The camera's video image signal output is then amplified and electronically enhanced by a computer system on board the aircraft to reduce any noise produced by the image intensifier low light level scintillation. The enhanced and amplified video is then combined electronically with any symbology or other sensor's video signal and displayed through the display system 516 to the user. This enhanced and combined video can be recorded exactly as seen by the user or transmitted to other remote locations.

Most image intensifiers produce a 40° circular field of view (FOV), while recording camera systems typically have a rectangular 30° horizontal by 22.5° vertical FOVs. The rectangular shape LC-type shutter 510 is placed in close proximity to the image intensifier's output image in order to block the eye from seeing the exact area that is being viewed by the camera optical system. Similarly, the display system will have the same FOV projected as the camera, thus producing the same size image as the intensifier. In this ELLL mode, the user will see a 40° circular intensified image with an inserted rectangular 30° by 22.5° enhanced image and any symbology, similar to the "picture-in-picture" technology common in many of today's higher-priced television sets.

Although the system and method provided by the present invention have been described with a preferred embodiment, those skilled in the art will understand that modifications and variations may be made without departing from the scope of this invention as set forth in the following claims. Such modifications and variations are considered to be within the purview and scope of the appended claims. For example, although visor-mounted or helmet-mounted night vision imaging apparatus are described herein, the apparatus could readily be designed for mounting directly to a helmet, if desired. In addition, the optical components of FIGS. 1–43 may differ from each other as long as their effective components are able to achieve the desired parameters of the vision system, such as the desired magnification and effective focal lengths of the components of the system.

What is claimed is:

1. An image enhancement system for a night vision goggle system of the type having an image intensifier for converting incoming infrared and/or visible light to an intensified visible image for presentation via an eyepiece to the eyes of a user, said image enhancement system comprising:
   a pair of rotators;
   a pair of polarizers; and,
   a filter, said filter is positioned in alignment with said rotators and said polarizers;
   wherein central band light from the image intensifier is directed to the eye of the user when said polarizers and rotators are aligned in a first orientation, and
   wherein said central band light is directed away from the eye of the user when said polarizers and rotators are aligned in a second orientation.

2. The system of claim 1 wherein said filter is a dichroic type narrow-band-pass filter.

3. The system of claim 2 wherein said filter is contained in the eyepiece of the night vision goggle.

4. The system of claim 1 further comprising a camera channel including a camera, wherein when said polarizers and rotators are aligned in said first orientation, said side band light from the image intensifier is reflected to said camera, wherein real-time images can be recorded and transmitted, and when said polarizers and rotators are aligned in said second orientation, said central band light is directed to said camera.

5. The system of claim 4 wherein the intensified visible image presented to the user comprises a circular image with a rectangular insert when said polarizers and rotators are aligned in said second orientation.

6. The system of claim 4 wherein said pair of rotators are liquid crystal type shutters.

7. The system of claim 1 further comprising a display channel including a display for displaying secondary information to the user and to the camera when said polarizers and rotators are aligned in said first orientation.

8. The system of claim 1 wherein the intensified visible image presented to the user comprises a circular image with a rectangular insert when said polarizers and rotators are aligned in said second orientation.

9. The system of claim 1 wherein said filter is contained in the eyepiece of the night vision goggle.

10. The system of claim 1 wherein said pair of rotators are liquid crystal type shutters.

11. A method for enhancing an image of a night scene produced by the image intensifier of a night vision goggle system, which comprises:
   passing light from the image intensifier through a first polarizer to produce polarized light;
   filtering said polarized light through a filter, wherein said polarized light is split into at least central band light and side band light;
   directing said central band light through a second polarizer to the eye of a user; and
   providing a camera channel including a third polarizer and a camera, directing said side band light through said third polarizer and to said camera for recording or transmitting real-lime images.

12. The method of claim 11 wherein at least said first polarizer is a liquid crystal type shutter.

13. The method of claim 11 wherein said filter is a dichroic type narrow-band-pass filter.

14. The method of claim 13 wherein at least said first polarizer is a liquid crystal type shutter.

15. The method of claim 11 wherein said first polarizer and said third polarizer are liquid crystal type shutters.

16. The method of claim 11 further comprising providing a display channel including a fourth polarizer and a display, orienting said fourth polarizer relative to said filter such that said central band light is directed to the eye of said user.

17. The method of claim 16 wherein said filter is a dichroic type narrow-band-pass filter.

18. The method of claim 17 including the step of electronically enhancing said video image signal output to produce enhanced video image signal output.

19. The method of claim 18 including the step of combining secondary information with said enhanced video image signal output.

20. The method of claim 19 including further the step of directing said combined and enhanced video via said display to the eye of the user.

21. The method of claim 20 including the step of recording said combined and enhanced video.

22. The method of claim 21 including the step of transmitting said combined and enhanced video.

23. The system of claim 22 wherein said filter is located inside the eyepiece of the night vision goggle.

24. The method of claim 23 wherein said first polarizer and said third polarizer are liquid crystal type shutters.

25. The method of claim 11 wherein said filter is a dichroic type narrow-band-pass filter.

26. The method of claim 25 wherein said first polarizer and said third polarizer are liquid crystal type shutters.

27. An image enhancement system for a night vision goggle system of the type having an image intensifier for converting incoming infrared and/or visible light to an intensified visible image for presentation via an eyepiece to the eyes of a user, said image enhancement system comprising:

beamsplitting means for splitting light from the image intensifier into a central band and side bands; and directing means in alignment with said beamsplitting means for directing said central band and said side bands, wherein said directing means is adjustable between a first position and a second position.

28. The system of claim 27 including a camera channel that includes a camera, and a display channel that includes a display system, wherein said directing means directs said central band through said eyepiece to the eyes of the user and directs said side bands through said camera channel to said camera when said directing means is in said first position, and said directing means directs said central band light through said camera channel to said camera when said directing means is in said second position.

29. The system of claim 27 wherein said directing means comprises a pair of rotators and a pair of polarizers.

30. The system of claim 29 wherein said rotators are liquid crystal type shutters.

31. The system of claim 27 wherein said beamsplitting means is a dichroic type narrow-band-pass filter.

* * * * *

UNITED STATES PATENT AND TRADEMARK OFFICE
CERTIFICATE OF CORRECTION

PATENT NO. : 7,170,057 B2 Page 1 of 1
APPLICATION NO. : 10/250388
DATED : January 30, 2007
INVENTOR(S) : Danny Filipovich et al.

It is certified that error appears in the above-identified patent and that said Letters Patent is hereby corrected as shown below:

On the Title Page Item (73) Assignee, please add the following as a second assignee:

--Kollsman, Inc.
Merrimack, NH (US)--

Signed and Sealed this

Second Day of September, 2008

JON W. DUDAS
*Director of the United States Patent and Trademark Office*